United States Patent
Yoshimochi et al.

(10) Patent No.: US 10,476,711 B2
(45) Date of Patent: Nov. 12, 2019

(54) DATA PROCESSING DEVICES AND DATA PROCESSING METHODS

(71) Applicant: SONY CORPORATION, Tokyo (JP)

(72) Inventors: Naoki Yoshimochi, Kanagawa (JP); Satoshi Okada, Tokyo (JP); Makiko Yamamoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/767,697

(22) PCT Filed: Jan. 6, 2015

(86) PCT No.: PCT/JP2015/050091
§ 371 (c)(1),
(2) Date: Aug. 13, 2015

(87) PCT Pub. No.: WO2015/107925
PCT Pub. Date: Jul. 23, 2015

(65) Prior Publication Data
US 2015/0372845 A1     Dec. 24, 2015

(30) Foreign Application Priority Data

Jan. 16, 2014 (JP) ................. 2014-005655

(51) Int. Cl.
*H04L 25/14* (2006.01)
*H04N 21/845* (2011.01)
(Continued)

(52) U.S. Cl.
CPC ............ *H04L 25/14* (2013.01); *H04L 5/0044* (2013.01); *H04L 5/0091* (2013.01);
(Continued)

(58) Field of Classification Search
CPC ... H04L 25/14; H04L 5/0091; H04N 21/2385; H04N 21/2389; H04N 21/4381;
(Continued)

(56) References Cited

U.S. PATENT DOCUMENTS

| | | | |
|---|---|---|---|
| 7,209,636 B2 * | 4/2007 | Imahashi | G11B 27/031 375/E7.271 |
| RE40,256 E * | 4/2008 | Oshima | G11B 20/00086 348/724 |

(Continued)

FOREIGN PATENT DOCUMENTS

| | | |
|---|---|---|
| EP | 2 639 991 A2 | 9/2013 |
| JP | 2002-223437 A | 8/2002 |

(Continued)

OTHER PUBLICATIONS

TS 102 991 V1.2.1 (Jun. 2011), titled Digital Video Broadcasting (DVB); Implementation Guidelines for a second generation digital cable transmission system (DVB-C2), (TS-102991 hereinafter) was published Jun. 2011.*

(Continued)

*Primary Examiner* — Jamaal Henson
(74) *Attorney, Agent, or Firm* — Oblon, McClelland, Maier & Neustadt, L.L.P.

(57) ABSTRACT

The present technology relates to data processing devices and data processing methods that lower costs and enable CB (Channel Bonding). A transmission device divides a BB stream as a stream of BB (Baseband) frames into divisional streams by distributing the BB frames of the BB stream to data slices. The dividing of the BB stream is performed by limiting the data rate ratio between the data rates of the divisional streams. A reception device recomposes the original BB stream from the divisional streams obtained from data transmitted from the transmission device. The present (Continued)

US 10,476,711 B2
Page 2 technology can be applied to CB such as PLP (Physical Layer Pipe) bundling.

6 Claims, 15 Drawing Sheets

(51) Int. Cl.
| | |
|---|---|
| H04L 5/00 | (2006.01) |
| H04N 21/2389 | (2011.01) |
| H04N 21/4385 | (2011.01) |
| H04N 21/2385 | (2011.01) |
| H04N 21/438 | (2011.01) |
| H04N 21/61 | (2011.01) |

(52) U.S. Cl.
CPC ..... *H04N 21/2385* (2013.01); *H04N 21/2389* (2013.01); *H04N 21/4381* (2013.01); *H04N 21/4385* (2013.01); *H04N 21/6112* (2013.01); *H04N 21/6118* (2013.01); *H04N 21/8456* (2013.01)

(58) Field of Classification Search
CPC ........... H04N 21/4385; H04N 21/6112; H04N 21/6118; H04N 21/8456
See application file for complete search history.

(56) References Cited

U.S. PATENT DOCUMENTS

| | | | | |
|---|---|---|---|---|
| 7,630,412 B2* | 12/2009 | Wright | ............... | H04L 25/14 370/352 |
| 7,808,932 B2* | 10/2010 | Chen | ............... | H04L 12/185 370/270 |
| 7,894,541 B2* | 2/2011 | Oshima | ............... | H03M 13/256 375/219 |
| 8,165,060 B2* | 4/2012 | Barroso | ............... | H04B 7/18515 370/316 |
| 8,339,406 B2* | 12/2012 | Prabhakar | ............... | H04N 19/70 345/531 |
| 8,509,590 B2* | 8/2013 | Saito | ............... | G11B 27/036 386/211 |
| 8,670,653 B2* | 3/2014 | Shibata | ............... | H04N 19/70 386/326 |
| 2002/0163890 A1* | 11/2002 | Yoshimoto | ............... | H04J 3/1688 370/241 |
| 2002/0181458 A1* | 12/2002 | Amidan | ............... | H04L 25/14 370/389 |
| 2004/0125753 A1* | 7/2004 | Mahany | ............... | H04L 1/0002 370/254 |
| 2004/0267951 A1* | 12/2004 | Hattori | ............... | H04N 21/4305 709/231 |
| 2005/0100045 A1* | 5/2005 | Hunkeler | ............... | H04W 72/1231 370/465 |
| 2005/0117608 A1* | 6/2005 | Karakawa | ............... | H04J 3/1617 370/486 |
| 2006/0203713 A1* | 9/2006 | Laroia | ............... | H04L 5/023 370/209 |
| 2006/0233525 A1* | 10/2006 | Shibata | ............... | H04N 19/70 386/329 |
| 2008/0120667 A1* | 5/2008 | Zaltsman | ............... | H04L 12/2856 725/110 |
| 2008/0285690 A1* | 11/2008 | Kwon | ............... | H04H 40/27 375/345 |
| 2011/0019690 A1* | 1/2011 | Bichot | ............... | H04L 1/0007 370/465 |
| 2011/0099446 A1* | 4/2011 | Murakami | ............... | H04L 1/0041 714/748 |
| 2011/0188459 A1* | 8/2011 | Krishnamoorthi | ............... | H04N 21/2383 370/329 |
| 2012/0076127 A1* | 3/2012 | Mourad | ............... | H04L 1/0079 370/345 |
| 2012/0327955 A1* | 12/2012 | Herrmann | ............ | H04N 21/235 370/476 |
| 2013/0117624 A1* | 5/2013 | Nicolas | ................. | H03M 13/27 714/755 |
| 2013/0263201 A1* | 10/2013 | Chung-How | ......... | H04L 1/0003 725/116 |
| 2015/0012804 A1* | 1/2015 | Yu | ......................... | H04L 1/0057 714/784 |
| 2015/0049711 A1* | 2/2015 | Hwang | ................. | H04L 5/0053 370/329 |
| 2015/0264090 A1* | 9/2015 | Kim | .................... | H04L 65/1069 370/329 |

FOREIGN PATENT DOCUMENTS

| | | | |
|---|---|---|---|
| JP | 2002-223473 A | | 8/2002 |
| JP | 2005-176068 A | | 6/2005 |

OTHER PUBLICATIONS

EN 302 769 V1.2.1 (Dec. 2012), titled "Digital Video Broadcasting (DVB); Frame structure channel coding and modulation for a second generation digital transmission system for cable systems (DVB-C2)", (EN-302769 hereinafter) was originally published in Dec. 2010.*
K. R. Rao, et al.,"Joint video encoding in DVB/ATSC multi-program transmission: MPEG-2 vs. H.264/AVC bitrate control," 2009 9th International Conference on Telecommunication in Modern Satellite, Cable, and Broadcasting Services, Nis, 2009, pp. 3-12, doi: 10.1109/TELSKS.2009.5339481.*
T. L. Alves de Souza Ramos, et al., "Watershed: A High Performance Distributed Stream Processing System," 2011 23rd International Symposium on Computer Architecture and High Performance Computing, Vitoria, Espirito Santo, 2011, pp. 191-198, doi: 10.1109/SBAC-PAD.2011.31.*
EN 302 769 V1.2.1 (Dec. 2010), titled "Digital Video Broadcasting (DVB); Frame structure channel coding and modulation for a second generation digital transmission system for cable systems (DVB-C2)", (EN-302769 hereinafter) was originally published in Dec. 2010.*
ETSI TS 102 991 V1.2.1 (Jun. 2012), titled "Digital Video Broadcasting (DVB); Implementation Guidelines for a second generation digital cable transmission system (DVB-C2)", (TS102991 hereinafter) was originally published in Jun. 2011.*
S. Correia et al., "DVB-T2 modulator design supporting multiple PLP and auxiliary streams," 2010 IEEE International Symposium on Broadband Multimedia Systems and Broadcasting (BMSB), Shanghai, 2010, pp. 1-6.; doi: 10.1109/ISBMSB.2010.5463083.*
EN 302 769 V1.2.1 (Dec. 2010), titled "Digital Video Broadcast (DVB); Frame Structure Channel Coding and Modulation for Second Generation Digital Transmission System for Cable Systems (DVB-C2)", (EN-302769 hereinafter) was originally published Dec. 2010 (Year: 2010).*
ETSI TS 102 991 V1.2.1 (Jun. 2012), titled "Digital Video Broadcasting (DVB; Implementation Guidelines for a Second Generation Digital Cable Transmission System (DVB-C2)", (TS 102991 hereinafter) (Year: 2011).*
S. Correia et al. ,"DVB-T2 Modulator Design Supporting Multiple PLP and Auxiallry Streams", 2010 IEEE International Symposium on Broadband Multimedia Systems and Broadcasting (BMSB), Shanghai, 2010. pp. 1-6 (Year: 2010).*
International Search Report dated Apr. 7, 2015 in PCT/JP2015/050091.
"Digital Video Broadcasting (DVB); Implementation Guidelines for a second generation digital cable transmission system (DVB-C2)" ETSI TS 102 991 V1.2.1, Jun. 2011, 5 Pages.
"Digital Video Broadcasting (DVB), Frame structure channel coding and modulation for a second generation digital transmission system for cable systems (DVB-C2)" ETSI EN 302 769 V1.2.1, Apr. 2011, 3 Pages.
EP Search Report dated Jun. 21, 2017 in Application No. 15737615. 3- 1905/3096527 PCT/JP2015050091, 8 pages.

(56) References Cited

OTHER PUBLICATIONS

ETSI TS 102 991 V1.3.1, Digital Video Broadcasting (DVB); Implementation Guidelines for a second generation digital cable transmission system (DVB-C2), (2013-XX), 183 pages.
ETSI EN 302 769 V1.2.1, Digital Video Broadcasting (DVB); Frame structure channel coding and modulation for a second generation digital transmission system for cable systems (DVB-C2), (Apr. 2011), 111 pages.
Combined Chinese Office Action and Search Report dated Sep. 30, 2018 in Patent Application No. 201580000397.7 (with English language translation).
"ETSI TS 102991 V1.1.1, Digital Video Broadcasting (DVB); Implementation Guidelines for a second generation digital cable transmission system (DVB-C2)", Aug. 2010, 146 pages.
Office Action dated Jan. 29, 2019 in corresponding Japanese Patent Application No. 2015-538780, 5 pages.
Office Action dated Nov. 15, 2018 in corresponding Japanese Patent Application No. 2015-538780, 5 pages.

\* cited by examiner

FIG. 8

| First Byte | | | | Second Byte | Third Byte | |
|---|---|---|---|---|---|---|
| Bit-7 (MSB) | Bit-6 | Bit-5 and bit-4 | Bit-3 and bit-2 | Bit-1 and bit-0 | Bit-7 to bit-0 | Bit-7 bit-0 |
| 0=ISCRshort | MSB of ISCRshort | next 6 bits of ISCRshort | | | Next 8 bits of ISCRshort | Not present | ISCR (TIME INFORMATION) |
| 1 | 0= ISCRlong | 6 MSBs of ISCRlong | | | Next 8 bits of ISCRlong | Next 8 bits of ISCRlong | |
| 1 | 1 | 00=BUFS | BUFS unit 00=bits 01=Kbits 10=Mbits 11=8 Kbits | 2 MSBs of BUFS | Next 8 bits of BUFS | Not present when ISCRshort is used;else reserved for future use | BUFS (REQUIRED Buffer AMOUNT) |
| 1 | 1 | 10=BUFSTAT | BUFSTAT unit 00=bits 01=Kbits 10=Mbits 11=BUFS/1 02 4 | 2 MSBs of BUFSTAT | Next 8 bits of BUFSTAT | Not present when ISCRshort is used;else reserved for future use | BUFSTAT (READ START TIME) |
| 1 | 1 | Others=reserved for future use | Reserved for future use | Reserved for future use | Reserved for future use | Not present when ISCRshort is used;else reserved for future use | |

FIG. 13

DATA PROCESSING DEVICES AND DATA PROCESSING METHODS

TECHNICAL FIELD

The present technology relates to data processing devices and data processing methods, and more particularly, to data processing devices and data processing methods that lower costs and enable CB (Channel Bonding), for example.

BACKGROUND ART

Examples of transmission standards in digital broadcasting include DVB-C2, which is next-generation cable television standards and is standardized by DVB (Digital Video Broadcasting) (Non-Patent Document 1).

In DVB-C2, high-efficiency modulation methods and encoding methods are specified.

CITATION LIST

Non-Patent Document

Non-Patent Document 1: DVB-C.2:ETSI EN 302 769 V1.2.1 (2011-04)

SUMMARY OF THE INVENTION

Problems to be Solved by the Invention

As a technique for transmitting a stream with a high data rate in digital broadcasting, there is CB (Channel Bonding) by which a stream with a high data rate is divided into divisional streams of (channels) and is transmitted from the transmitting side, and the original stream with the high data rate is recomposed from the divisional streams on the receiving side.

In DVB-C2, PLP (Physical Layer Pipe) bundling is specified as a kind of CB.

In DVB-C2, however, the details of PLP bundling are not specified at present. Therefore, if some degree of freedom is allowed in PLP bundling on the transmitting side, the apparatus that recomposes the original stream with a high data rate on the receiving side might require higher costs than before.

The present technology has been made in view of these circumstances, and aims to lower costs and enable CB such as PLP bundling.

Solutions to Problems

A first data processing device of the present technology is a data processing device including a dividing unit that divides a BB stream as a stream of BB (Baseband) frames into divisional streams by distributing the BB frames of the BB stream to data slices, the dividing unit dividing the BB stream by limiting the data rate ratio between the data rates of the divisional streams.

A first data processing method of the present technology is a data processing method including the step of dividing a BB stream as a stream of BB (Baseband) frames into divisional streams by distributing the BB frames of the BB stream to data slices, the dividing of the BB stream being performed by limiting the data rate ratio between the data rates of the divisional streams.

In the first data processing device and data processing method of the present technology, a BB stream as a stream of BB (Baseband) frames is divided into divisional streams by distributing the BB frames of the BB stream to data slices. The dividing of the BB stream is performed by limiting the data rate ratio between the data rates of the divisional streams.

A second data processing device of the present technology is a data processing device including a recomposing unit that recomposes an original BB stream as a stream of BB (Baseband) frames from divisional streams transmitted from a transmission device, the transmission device including a dividing unit that divides the BB stream into the divisional streams by distributing the BB frames of the BB stream to data slices, the dividing unit dividing the BB stream by limiting the data rate ratio between the data rates of the divisional streams.

A second data processing method of the present technology is a data processing method including the step of recomposing an original BB stream as a stream of BB (Baseband) frames from divisional streams transmitted from a transmission device, the transmission device including a dividing unit that divides the BB stream into the divisional streams by distributing the BB frames of the BB stream to data slices, the dividing unit dividing the BB stream by limiting the data rate ratio between the data rates of the divisional streams.

In the second data processing device and data processing method of the present technology, an original BB stream as a stream of BB (Baseband) frames is recomposed from divisional streams transmitted from a transmission device, the transmission device including a dividing unit that divides the BB stream into the divisional streams by distributing the BB frames of the BB stream to data slices, the dividing unit dividing the BB stream by limiting the data rate ratio between the data rates of the divisional streams.

It should be noted that a data processing device may be an independent device, or may be an internal block in a single device.

Effects of the Invention

According to the present technology, CB can be performed at lowered costs.

The effects of the present technology are not limited to the effects described herein, and may include any of the effects described in this disclosure.

BRIEF DESCRIPTION OF DRAWINGS

FIG. 8 is a diagram showing the formats of ISSYs included in BB headers.

FIG. 13 is a diagram showing an example of divisional streams DS#0 and #1 to be transmitted with data slices DS#0 and DS#1, respectively, in a case where the transmission rate ratio between the transmission rates of the data slices DS#0 and DS#1 is 2.2:1.

MODES FOR CARRYING OUT THE INVENTION

Figure 1:
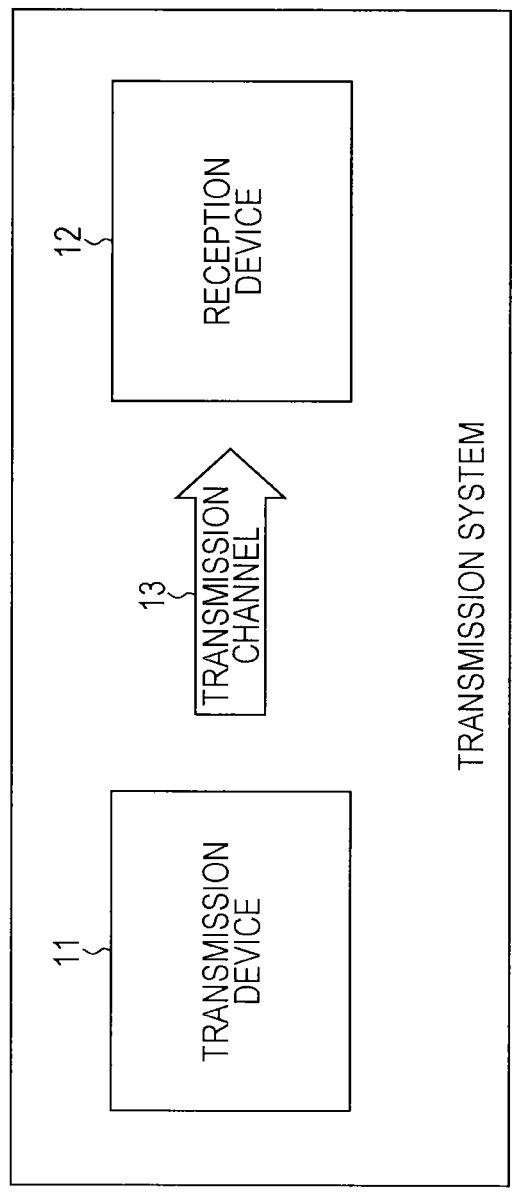
FIG. 1 is a block diagram showing an example structure of an embodiment of a transmission system to which the present technology is applied.

One Embodiment of a Transmission System to which the Present Technology is Applied FIG. 1 is a block diagram showing an example configuration of an embodiment of a transmission system to which the present technology is applied (a "system" means a logical assembly of devices, and the devices with respective structures are not necessarily housed in the same housing).

In FIG. 1, the transmission system includes a transmission device 11 and a reception device 12.

The transmission device 11 transmits television programs and the like (digital broadcasting) (data transmission). That is, the transmission device 11 transmits (sends) a stream of data to be transmitted, such as image data and audio data as a television program, via a transmission channel 13 that is a cable television network (a cable channel), in accordance with the DVB-C2 standards, for example.

The reception device 12 receives data transmitted from the transmission device 11 via the transmission channel 13, and restores and outputs the original stream.

The transmission system shown in FIG. 1 can be used not only for data transmission compliant with the DVB-C2 standards, but also for data transmission compliant with standards such as DVB-T2, DVB-S2, or ATSC (Advanced Television Systems Committee) standards, and other types of data transmission.

The transmission channel 13 is not necessarily a cable television network, but may be a satellite channel or a terrestrial channel, for example.

First Example Structure of the Transmission Device 11

Figure 2:
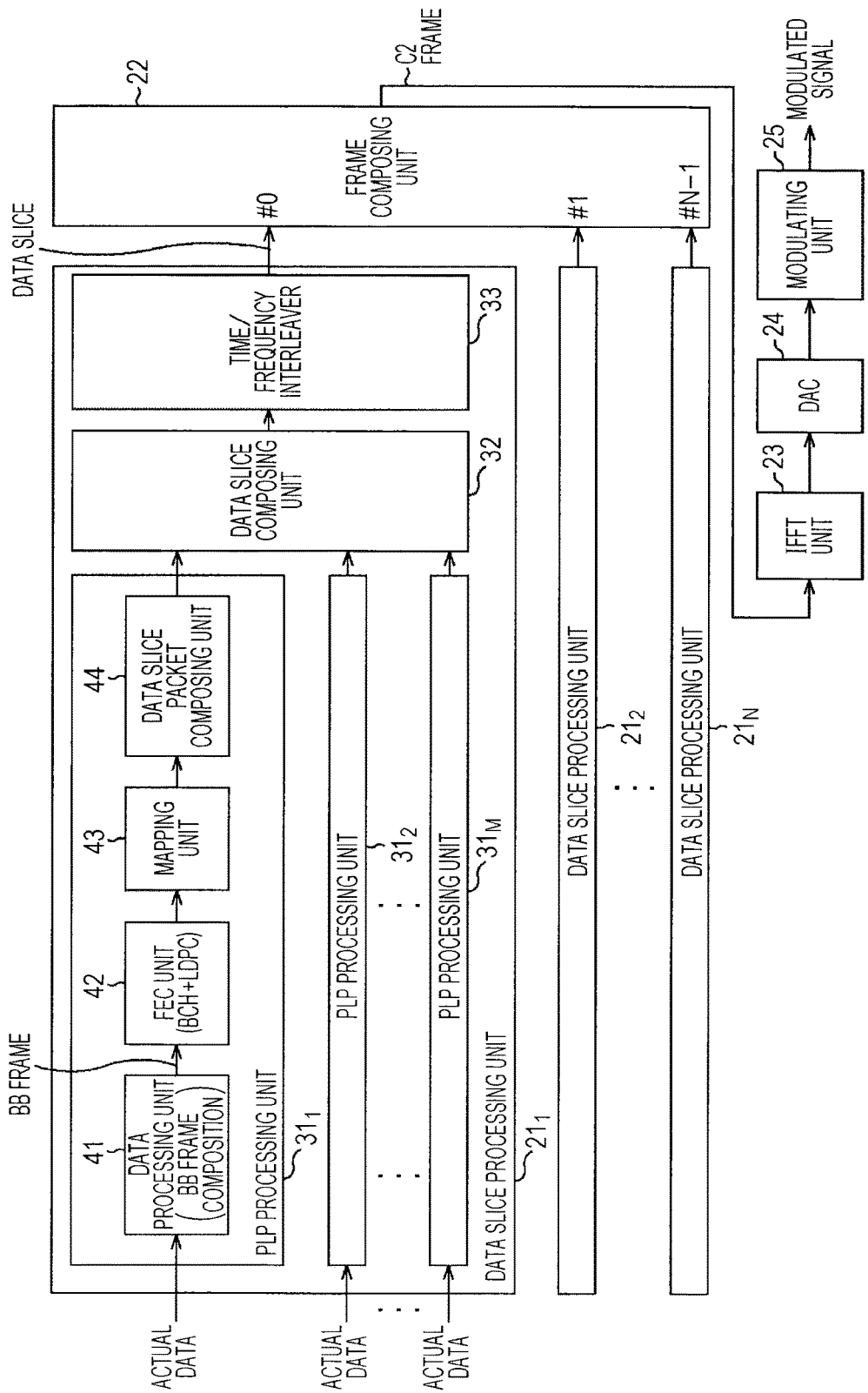
FIG. 2 is a block diagram showing a first example structure of a transmission device 11.

FIG. 2 is a block diagram showing a first example structure of the transmission device 11 shown in FIG. 1.

In FIG. 2, the transmission device 11 includes N (>1) data slice processing units $21_1, 21_2, \ldots, 21_N$, a frame composing unit 22, an IFFT (Inverse Fast Fourier Transform) unit 23, a DAC (Digital to Analog Converter) 24, and a modulating unit 25.

Each data slice processing unit $21_n$ (n=1, 2, ..., N) generates a data slice DS#n−1 as the nth data slice by processing (a stream of) actual data as target data such as a TS (Transport Stream), and supplies the data slice DS#n−1 to the frame composing unit 22.

That is, each data slice processing unit $21_n$ includes M (>0) PLP processing units $31_1, 31_2, \ldots, 31_M$, a data slice composing unit 32, and a time/frequency interleaver 33.

Each PLP processing unit $31_m$ (m=1, 2, ..., M) generates a data slice packet of a PLP by processing actual data as the PLP, and supplies the data slice packet to the data slice composing unit 32.

Here, a PLP is (the data to be transmitted through) a logical channel included in a data slice, and a unique PLP_ID for identifying the PLP is attached to the PLP. The PLP having a certain PLP_ID is equivalent to the actual data of a certain television program. Different PLP processing units $31_m$ and $31_{m'}$ process PLPs having different PLP_IDs from each other. Hereinafter, a PLP having "i" as its PLP_ID will be also written by PLP#i.

Among all the data slice processing units $21_1$ through $21_N$, the numbers M of the PLP processing units $31_1$ through $31_M$ are not necessarily the same. However, for ease of explanation, the numbers M of the PLP processing units $31_1$ through $31_M$ are the same among all the data slice processing units $21_1$ through $21_N$ in this example.

Each PLP processing unit $31_m$ includes a data processing unit 41, an FEC (Forward Error Correction) unit 42, a mapping unit 43, and a data slice packet composing unit 44.

Actual data is supplied to the data processing unit 41.

The data processing unit 41 composes a BB (Baseband) frame by attaching a BB header to a predetermined unit (a predetermined number of TS packets, for example) of actual data supplied thereto, and supplies the BB frame to the FEC unit 42.

The FEC unit 42 performs error correction encoding such as BCH encoding and LDPC encoding on the BB frame supplied from the data processing unit 41, and supplies the resultant FEC frame to the mapping unit 43.

The mapping unit 43 maps the FEC frame supplied from the FEC unit 42 as signal points in a constellation defined by a modulation method for predetermined digital orthogonal modulation, on a symbol-by-symbol basis, each symbol being formed with a predetermined number of bits. The mapping unit 43 supplies the symbols as the mapping result to the data slice packet composing unit 44 on a FEC frame basis.

The data slice packet composing unit 44 composes a data slice packet by attaching an FEC frame header to one or two FEC frames supplied from the mapping unit 43.

Here, an FEC frame header contains information such as the PLP_IDs of the PLPs forming the FEC frame having the FEC frame header attached thereto, the MODCOD indicating the modulation method (MOD) used in the orthogonal modulation in the mapping of the FEC frame, the code length in the error correction encoding performed on the FEC frame, and the like.

The data slice packet composing unit 44 composes a data slice packet, and supplies the data slice packet to the data slice composing unit 32.

The data slice composing unit 32 composes a data slice (DS#n−1) from the data slice packets supplied from the PLP processing units $31_1$ through $31_m$, and supplies the data slice to the time/frequency interleaver 33.

Here, a data slice is a collection of OFDM (Orthogonal Frequency-Division Multiplexing) cells transmitting PLPs, and an OFDM cell is data to be transmitted by a subcarrier of OFDM.

The time/frequency interleaver 33 interleaves the data slice supplied from the data slice composing unit 32 in the temporal direction, and further interleaves the data slice in the frequency direction. The time/frequency interleaver 33 supplies the data slice interleaved in the temporal direction and the frequency direction, to the frame composing unit 22.

The frame composing unit 22 composes a C2 frame containing one or more data slices supplied from the data slice processing units $21_1$ through $21_N$, and supplies the C2 frame to the IFFT unit 23.

The IFFT unit 23 performs IFFT on the C2 frame supplied from the frame composing unit 22, and supplies the resultant OFDM signal to the DAC 24.

The DAC 24 performs DA conversion on the OFDM signal supplied from the IFFT unit 23, and supplies the OFDM signal to the modulating unit 25.

The modulating unit 25 modulates the OFDM signal supplied from the DAC 24 into an RF (Radio Frequency) signal, and transmits the RF signal via the transmission channel 13 (FIG. 1).

Figure 3:
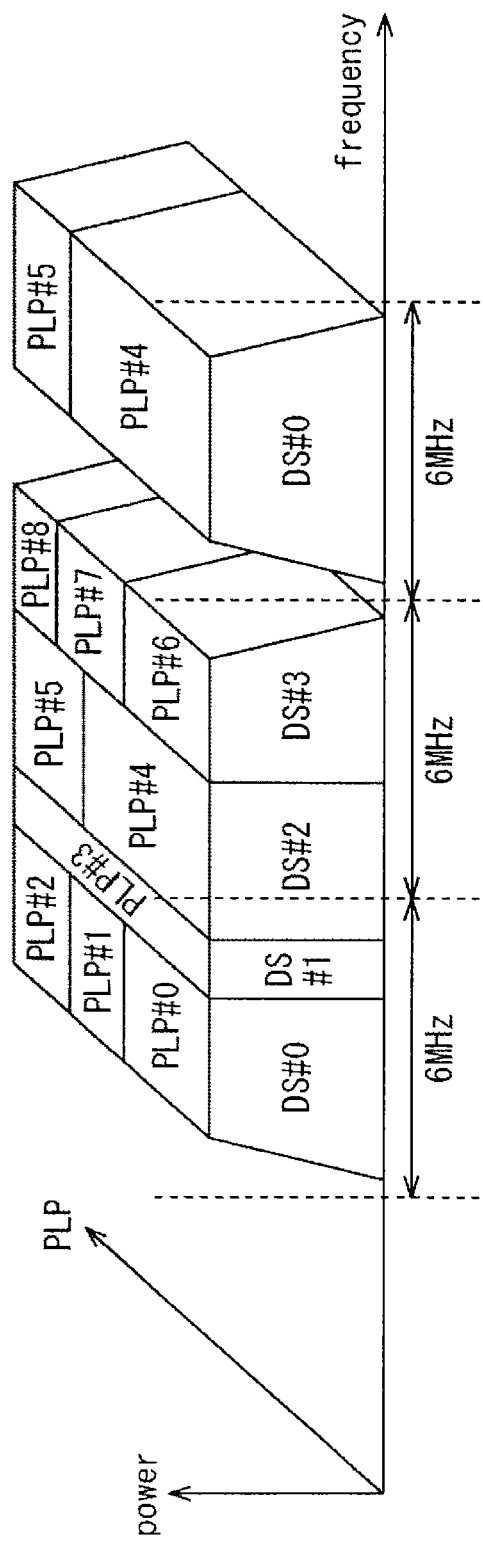
FIG. 3 is a diagram for explaining the relationship between PLPs and data slices to be processed in the transmission device 11.

FIG. 3 is a diagram for explaining the relationship between PLPs and data slices to be processed in the transmission device 11 shown in FIG. 2.

In FIG. 3, a data slice is formed with one or more PLPs.

By DVB-C2, the transmission band for transmitting (RF signals of) OFDM signals is divided into (approximately) 6-MHz unit bands. Where a transmission band that is a 6-MHz divisional band is set as a unit transmission band, the reception device 12 receives an OFDM signal of a unit transmission band in which a data slice DS#n−1 containing the PLPs#i of the actual data of a desired television program is transmitted, and processes the data slice DS#n−1 contained in the OFDM signal.

First Example Structure of the Reception Device 12

Figure 4:
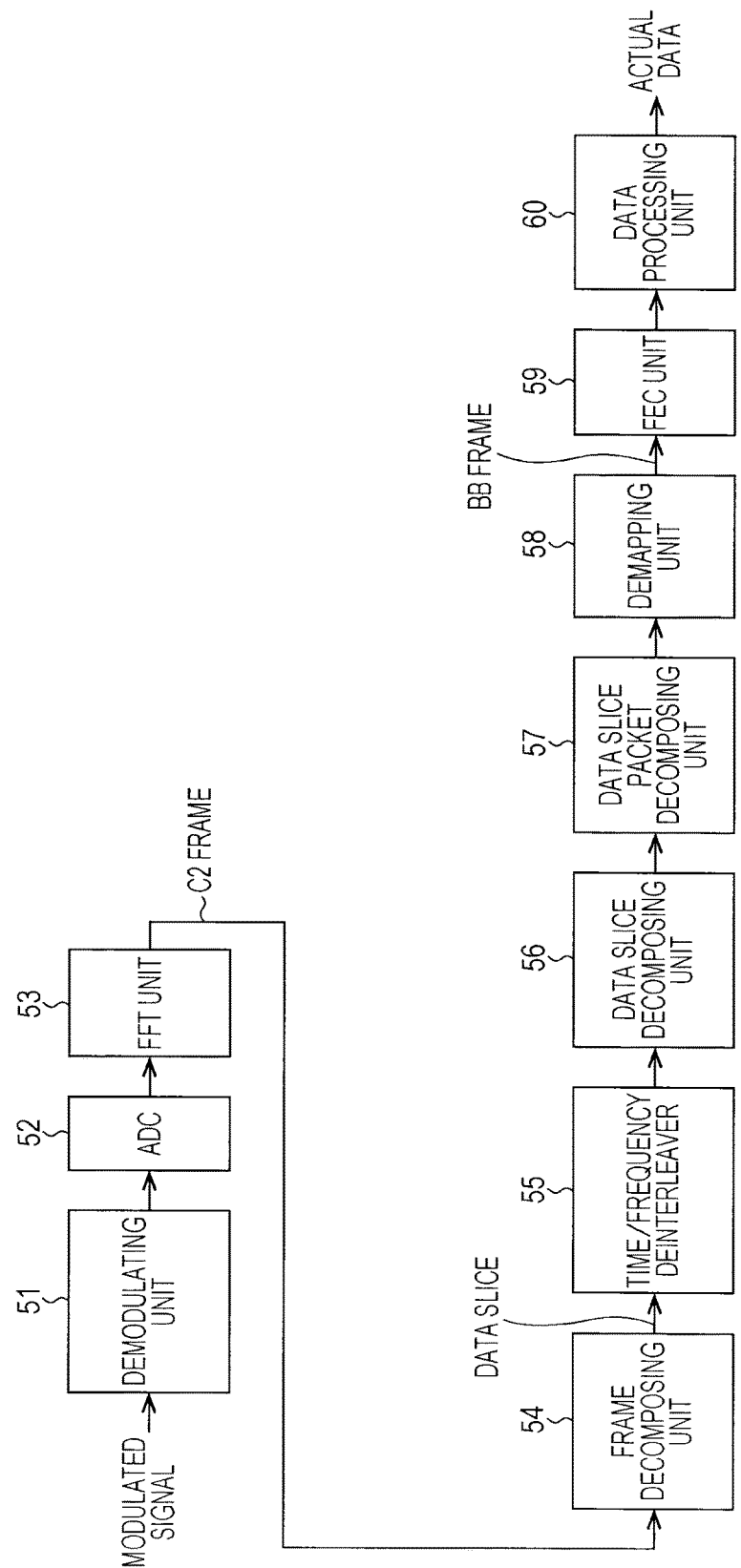
FIG. 4 is a block diagram showing a first example structure of a reception device 12.

FIG. 4 is a block diagram showing a first example structure of the reception device 12 shown in FIG. 1.

In FIG. 4, the reception device 12 includes a demodulating unit 51, an ADC (Analog to Digital Converter) 52, an FFT (Fast Fourier Transform) unit 53, a frame decomposing unit 54, a time/frequency deinterleaver 55, a data slice decomposing unit 56, a data slice packet decomposing unit 57, a demapping unit 58, an FEC unit 59, and a data processing unit 60.

The demodulating unit 51 receives and demodulates an RF signal in a predetermined band transmitted (sent) from the transmission device 11 via the transmission channel 13 (FIG. 1), and supplies the resultant demodulated signal (OFDM signal) to the ADC 52.

The ADC 52 performs AD conversion on the demodulated signal supplied from the demodulating unit 51, and supplies the resultant digital signal to the FFT unit 53.

The FFT unit 53 performs FFT on the digital signal supplied from the ADC 52, and supplies (a signal of) the resultant C2 frame to the frame decomposing unit 54.

The frame decomposing unit 54 extracts the data slice contained in the C2 frame by decomposing the C2 frame supplied from the FFT unit 53, and supplies the data slice to the data slice decomposing unit 56.

The data slice decomposing unit 56 decomposes the data slice supplied from the frame decomposing unit 54 into data slice packets, and supplies the data slice packets to the data slice packet decomposing unit 57.

The data slice packet decomposing unit 57 decomposes the data slice packets into FEC frames by removing the FEC frame header from the data slice packets supplied from the data slice decomposing unit 56, and supplies the FEC frames to the demapping unit 58.

Here, the modulation method for the FEC frames, the code length, and the like are recognized, and the demapping unit 58 and the FEC unit 59 in the later stages are controlled based on the FEC frame header removed by the data slice packet decomposing unit 57.

The demapping unit 58 performs demapping on (the symbols of) the FEC frames supplied from the data slice packet decomposing unit 57, and supplies the FEC frames to the FEC unit 59.

On the FEC frames subjected to the demapping by the demapping unit 58, the FEC unit 59 performs error correcting code decoding as the error correction corresponding to the error correction encoding performed by the FEC unit 42 shown in FIG. 2. By doing so, the FEC unit 59 restores the BB frame obtained by the data processing unit 41 shown in FIG. 2, and supplies the BB frame to the data processing unit 60.

The data processing unit 60 decomposes the BB frame supplied from the FEC unit 59, and restores and outputs (a stream of) actual data.

Second Example Structure of the Transmission Device 11

Figure 5:
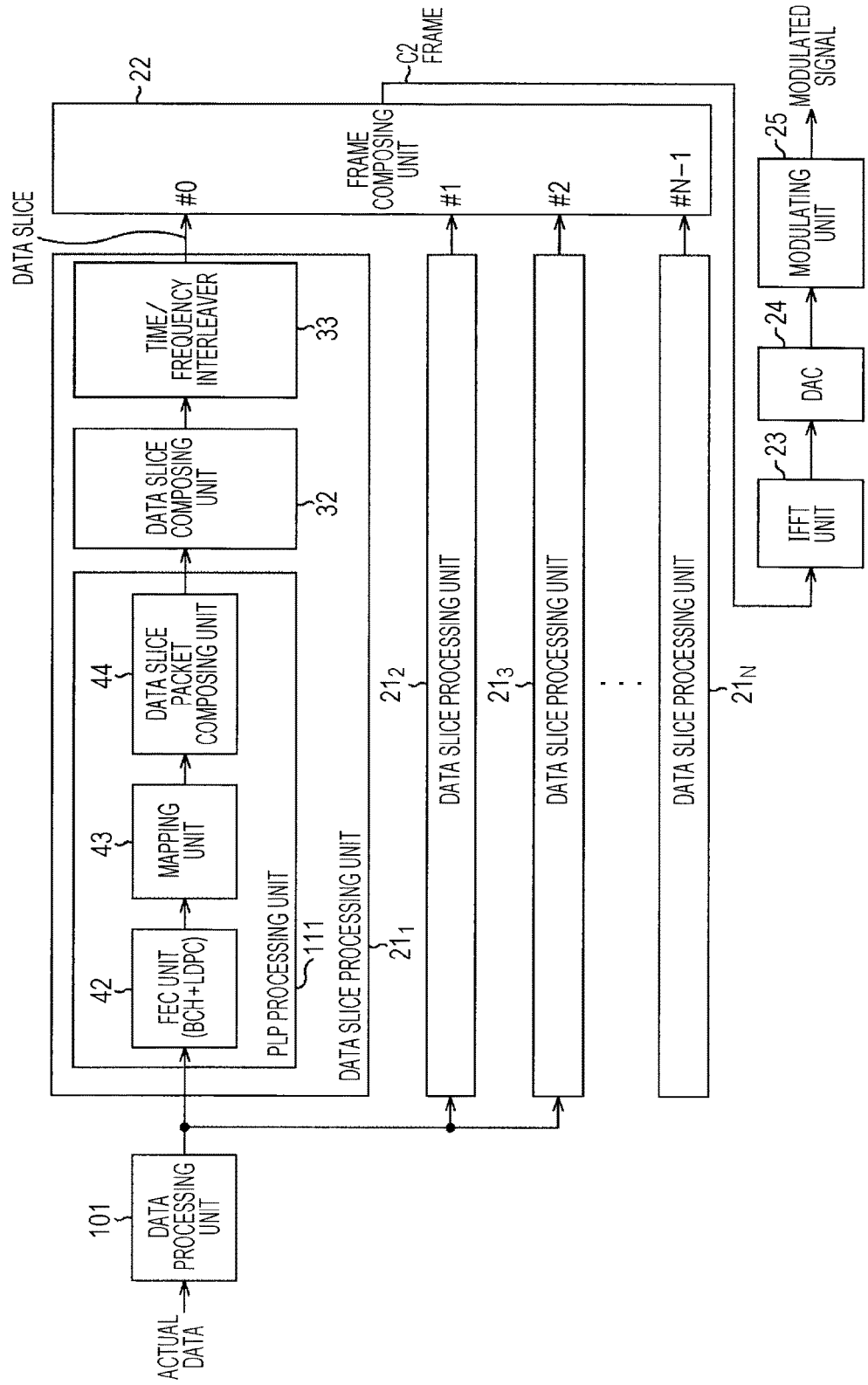
FIG. 5 is a block diagram showing a second example structure of the transmission device 11.

FIG. 5 is a block diagram showing a second example structure of the transmission device 11 shown in FIG. 1.

In the drawing, the components equivalent to those in FIG. 2 are denoted by the same reference numerals as those used in FIG. 2, and explanation thereof is not repeated herein.

In the transmission device 11 (FIG. 2) having the first example structure, a PLP#i equivalent to the actual data of a certain television program is transmitted with one data slice DS#n−1.

There is a limit to the data slice transmission rate or the transmission rate at which data can be transmitted with one data slice. In a case where the data rate of one PLP#i as the actual data of a certain television program exceeds the data slice transmission rate, it is difficult to transmit the PLP#i with the data slice.

Recently, there is a demand for digital broadcasting to transmit images with a high resolution such as 8 k. In a case where an image with the resolution of 8 k is encoded by HEVC (High Efficiency Video Coding), the throughput required for transmitting the data with a high data rate obtained as a result of the encoding is approximately 100 Mbps.

As for one PLP#i equivalent to such data with a high data rate, it might be difficult to perform transmission with one data slice depending on the digital orthogonal modulation employed in the mapping, the code rate of the error correcting code employed in the error correction, or the like.

In view of this, in the transmission device 11 having the second example structure (FIG. 5), actual data as one PLP#i (PLPs with the same PLP_ID) is divided on a BB frame basis and can be transmitted with data slices by PLP bundling, which is a kind of CB.

It should be noted that FIG. 5 does not show the blocks not related to PLP bundling.

In FIG. 5, the transmission device 11 includes N data slice processing units $21_1$ through $21_N$, a frame composing unit 22, an IFFT unit 23, a DAC 24, and a modulating unit 25. In this aspect, the transmission device 11 is the same as the first example structure shown in FIG. 2.

However, the transmission device 11 shown in FIG. 5 differs from the first example structure shown in FIG. 2, in that a data processing unit 101 is newly provided.

Further, the transmission device 11 shown in FIG. 5 differs from the first example structure shown in FIG. 2, in that each data slice processing unit $21_n$ includes a PLP processing unit 111, instead of the M PLP processing units $31_1$ through $31_m$.

The PLP processing unit 111 can be provided in place of one or more of the M PLP processing units $31_1$ through $31_M$, not in place of all of the M PLP processing units $31_1$ through $31_m$.

The PLP processing unit 111 includes an FEC unit 42, a mapping unit 43, and a data slice packet composing unit 44. In this aspect, the PLP processing unit 111 is the same as each PLP processing unit $31_m$ shown in FIG. 2.

Accordingly, the PLP processing unit 111 performs the same processing as each PLP processing unit $31_m$ shown in FIG. 2, except for the processing to be performed by the data processing unit 41 shown in FIG. 2.

In FIG. 5, the transmission device 11 divides (a stream of) actual data as one PLP#i on a BB frame basis by PLP bundling, and transmits data slices, or three data slices, for example.

In the PLP bundling, the number of data slices used in the transmission of one PLP#i is not limited to three, but may be two or a value of four or greater.

The three data slices to be used in the PLP bundling may be data slices generated by any three of the N data slice processing units $21_1$ through $21_N$. In FIG. 5, data slices DS#0, #1, and #2 generated by the data slice processing units $21_1$ through $21_3$ are employed as the three data slices to be used in the PLP bundling.

The transmission rates of the three data slices DS#0, #1, and #2 to be used in the PLP bundling (the transmission rates that can be used in (allocated to) the PLP bundling in the data slices) are not necessarily the same.

Since one PLP#i is transmitted with the three data slices DS#0 through #2 in the transmission device 11 shown in FIG. 5, the data processing unit 101 divides the actual data as PLPs#i having the same PLP_ID into three divisional streams corresponding in number to the data slices DS#0 through #2 to be used in transmission of the actual data.

That is, the actual data as PLPs#i having the same PLP_ID is supplied to the data processing unit 101.

Like the data processing unit 41 shown in FIG. 2, the data processing unit 101 composes a BB frame by attaching a BB header to the actual data supplied thereto. Further, with a BB stream as the stream of BB frames being the object to be divided, the data processing unit 101 divides the BB stream into three divisional streams on a BB frame basis by repeatedly distributing each of the BB frames constituting the BB stream to one data slice DS#n-1 among the three data slices DS#0 through #2.

The data processing unit 101 supplies the divisional stream formed with the BB frames distributed to the data slice DS#n-1, to the data slice processing unit $21_n$.

According to DVB-C2, there are NM (Normal Mode) and HEM (High Efficiency Mode) as the modes for processing PLPs. In a case where PLP bundling is performed, HEM is employed as the mode for processing PLPs.

In HEM, an ISSY (Input Stream Synchronizer) is included in a BB header.

An ISSY is time-related information about the transmission time of data (a BB frame) and the like, and the data processing unit 101 generates an ISSY, generates a BB header containing the ISSY, and composes a BB frame having the BB header.

Figure 6:
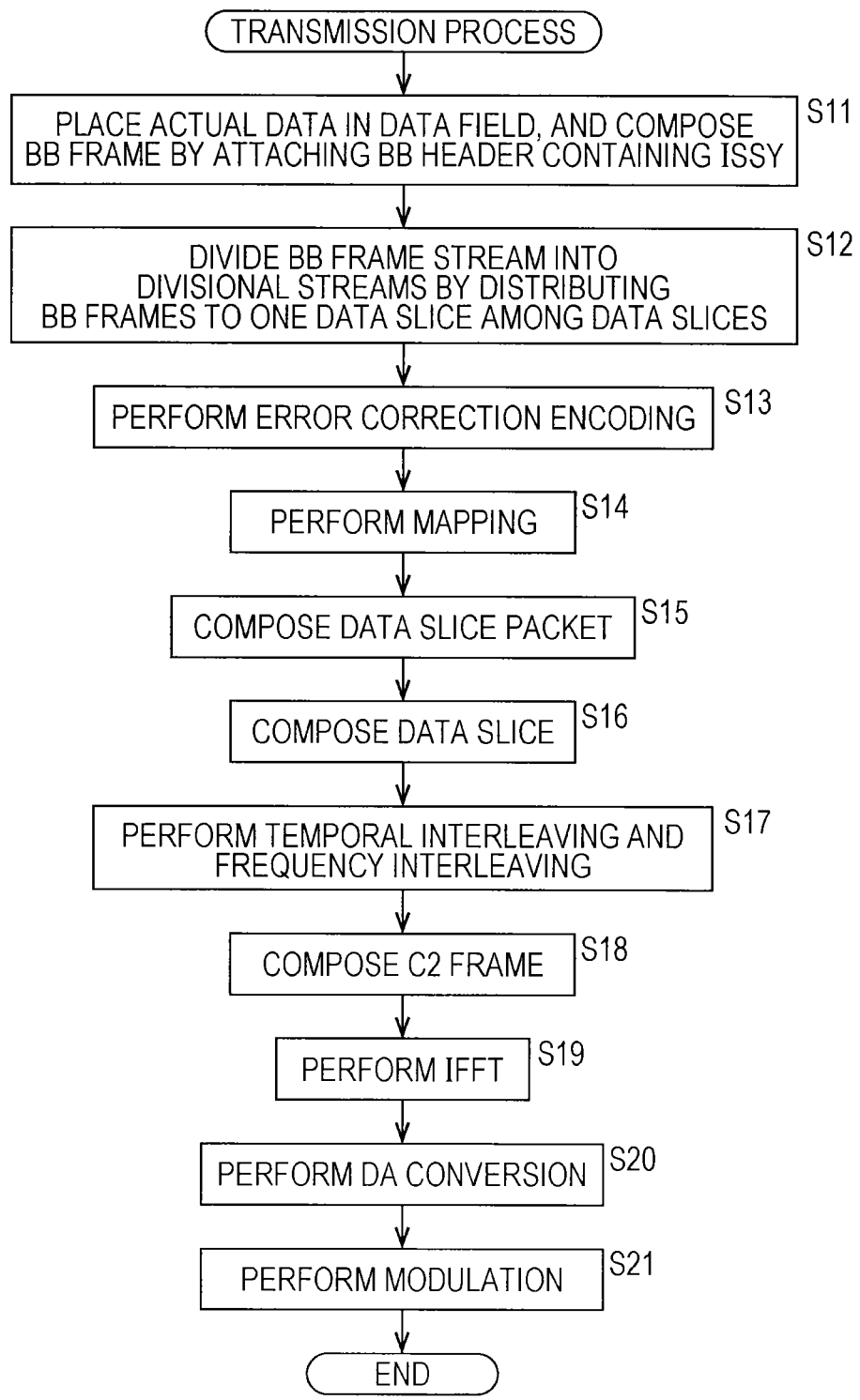
FIG. 6 is a flowchart for explaining an example of the process (transmission process) to be performed by the transmission device 11 in a case where data is transmitted by PLP bundling.

FIG. 6 is a flowchart for explaining an example of the process (transmission process) to be performed by the transmission device 11 shown in FIG. 5 in a case where data is transmitted by PLP bundling.

In the transmission process, the data processing unit 101 in step S11 places actual data supplied as a PLP thereto in a data field (of a BB frame), and composes a BB frame by attaching a BB header containing an ISSY to the data field. The process then moves on to step S12.

In step S12, the data processing unit 101 repeatedly distributes the BB frames constituting a BB stream as a stream of BB frames to one data slice DS#n-1 among the three data slices DS#0 through #2, to divide the BB stream into three divisional streams on a BB frame basis.

Of the three divisional streams, the divisional stream obtained by distributing the BB frames to the data slice DS#n-1 is supplied from the data processing unit 101 to the data slice processing unit $21_n$.

After that, the process moves from step S12 on to step S13. In the data slice processing unit $21_n$, the FEC unit 42 performs error correction encoding on the BB frames constituting the divisional stream supplied from the data processing unit 101 to the data slice processing unit $21_n$, and supplies the resultant FEC frame to the mapping unit 43. The process then moves on to step S14.

In step S14, for each symbol formed with a predetermined number of bits, the mapping unit 43 maps the FEC frame supplied from the FEC unit 42 on a signal point in a predetermined constellation, and supplies a symbol as a mapping result to the data slice packet composing unit 44 on a FEC frame basis. The process then moves on to step S15.

In step S15, the data slice packet composing unit 44 composes a data slice packet by attaching an FEC frame header to the FEC frame supplied from the mapping unit 43, and further supplies one or more data slice packets to the data slice composing unit 32. The process then moves on to step S16.

In step S16, the data slice composing unit 32 composes a data slice from the one or more data slice packets supplied from the data slice packet composing unit 44 (and each PLP processing unit $31_m$ not shown in FIG. 5), and supplies the data slice to the time/frequency interleaver 33. The process then moves on to step S17.

In the data slice processing units $21_1$ through $21_3$ shown in FIG. 5, the PLPs formed with divisional streams supplied from the data processing unit 101 are PLPs with the same PLP_ID. Therefore, the data slices DS#0 through DS#2 composed by the data slice processing units $21_1$ through $21_3$ shown in FIG. 5 contain PLPs with the same PLP_ID.

In step S17, the time/frequency interleaver 33 interleaves the data slice supplied from the data slice composing unit 32 in the temporal direction and the frequency direction, and supplies the interleaved data slice to the frame composing unit 22. The process then moves on to step S18.

In step S18, the frame composing unit 22 composes a C2 frame containing the one or more data slices supplied from (the time/frequency interleavers 33 of) the data slice processing units $21_1$ through $21_N$, and supplies the C2 frame to the IFFT unit 23. The process then moves on to step S19.

In step S19, the IFFT unit 23 performs IFFT on the C2 frame supplied from the frame composing unit 22, and supplies the resultant OFDM signal to the DAC 24. The process then moves on to step S20.

In step S20, the DAC 24 performs DA conversion on the OFDM signal supplied from the IFFT unit 23, and supplies the OFDM signal to the modulating unit 25. The process then moves on to step S21.

In step S21, the modulating unit 25 modulates the OFDM signal supplied from the DAC 24 into an RF signal, and transmits the RF signal via the transmission channel 13 (FIG. 1).

Figure 7:
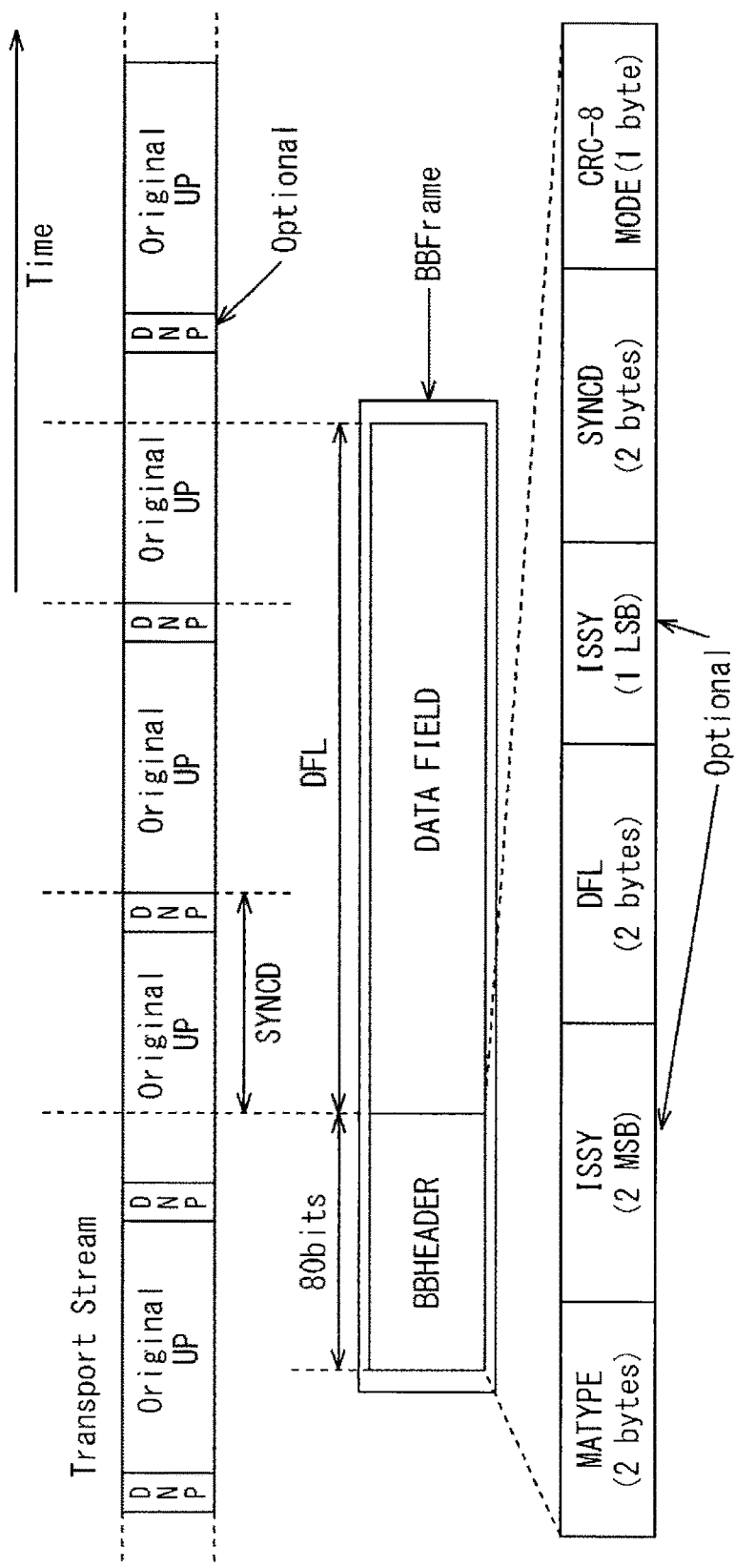
FIG. 7 is a diagram showing the format of a BB frame in HEM.

FIG. 7 is a diagram showing the format of a BB frame in HEM.

A BB frame (BBFrame) includes a BB header (BBHEADER) and a data field (DATA FIELD) in which actual data is placed.

The BB header is formed with 80 bits, and has a 3-byte field in which an ISSY is placed. The 3-byte field in which an ISSY is placed is divided into a 2-byte field and a 1-byte field.

In the transmission device 11 (FIG. 5), the FEC unit 42 performs BCH encoding on the BB frame, and performs LDPC encoding on a result of the BCH encoding.

Accordingly, the size Kbch of the data to be subjected to the BCH encoding is equal to the frame length of the BB frame. Since the BB header is formed with 80 bits as described above, the range (the number of bits) of the size DFL of the data field in the BB frame is represented, with Kbch, by the expression, $0<=DFL<=Kbch-80$.

The size Kbch of the data to be subjected to the BCH encoding is the number of bits within the range represented by the expression, $7032<=Kbch<=58192$.

FIG. 8 is a diagram showing the formats of ISSYs included in BB headers.

An ISSY is an ISCR (Input Stream Time Reference), a BUFS, or a BUFSTAT.

An ISCR is time information indicating the transmission time of data (a BB frame), and is 2- or 3-byte information.

A BUFS is (substantially) 2-byte information indicating the buffer capacity (Required Buffer Amount) required for compensating for delay variation in data processing in the reception device 12.

The two bits of the fifth bit and the sixth bit counted from the top of the bit string as a BUFS formed with two bytes (First Byte and Second Byte) are called BUFS_UNIT, and indicate the unit of the buffer capacity represented by the BUFS. The 10 bits formed with the seventh bit through the sixteenth and last bit indicate the value of the buffer capacity.

In the reception device 12, a storage area as a buffer of the buffer capacity indicated by the BUFS, and delay variation is compensated for (absorbed) by data reading/writing performed on the buffer.

BUFSTAT is (substantially) 2-byte information indicating the read start time at which data is read from the buffer of the buffer capacity indicated by a BUFS in the reception device 12.

The two bits of the fifth bit and the sixth bit counted from the top of the bit string as a BUFSTAT formed with two bytes (First Byte and Second Byte) are called BUFSTAT_UNIT, and indicate the unit of the read start time represented by the BUFSTAT. The 10 bits formed with the seventh bit through the sixteenth and last bit indicate the value of the read start time. The 10 bits of the BUFSTAT indicate the read start time (timing) in the form of the remaining data amount in the buffer when data is read from the buffer.

In the reception device 12, the data stored in the buffer of the buffer capacity indicated by a BUFS starts to be read out at the time indicated by a BUFSTAT (at the time when the remaining data amount in the buffer becomes equal to the value indicated by the BUFSTAT).

In a case where PLP bundling is not performed, an ISCR, a BUFS, or a BUFSTAT is selectively placed in the 3-byte field of the ISSY in the BB header of each BB frame.

In a case where PLP bundling is performed, the ISCR among an ISCR, a BUFS, and a BUFSTAT is placed in the 3-byte field of the ISSY in the BB header of each BB frame.

Figure 9:
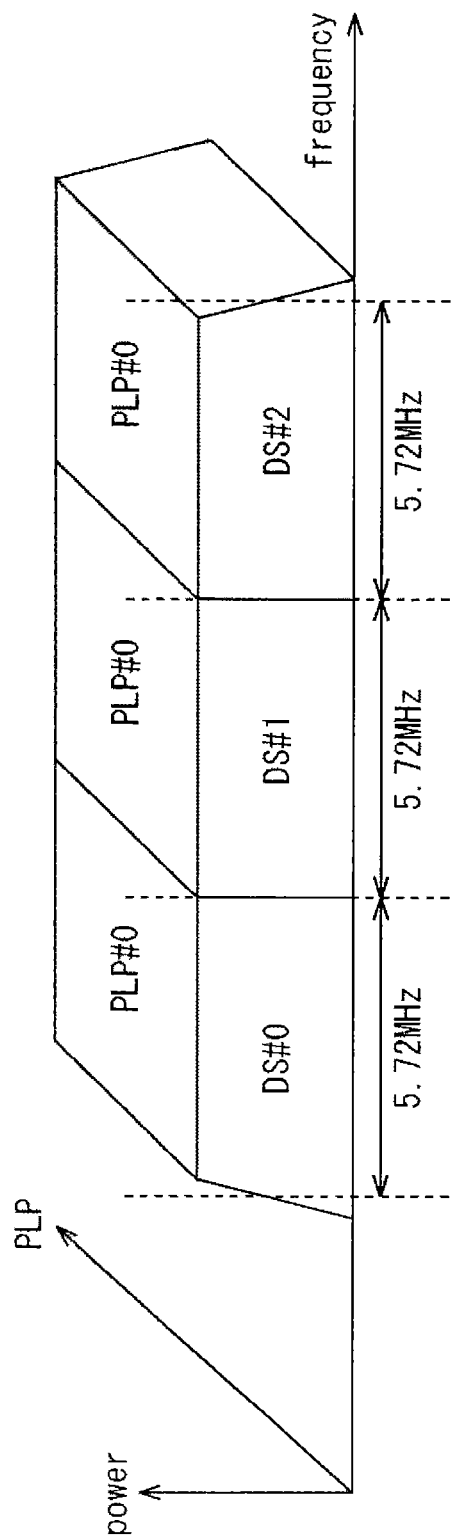
FIG. 9 is a diagram for explaining the relationship between PLPs and data slices to be processed in the transmission device 11.

FIG. 9 is a diagram for explaining the relationship between PLPs and data slices to be processed in the transmission device 11 shown in FIG. 5.

As shown in FIG. 9, in PLP bundling, PLPs with the same PLP_ID (PLPs#0 in FIG. 9) equivalent to the actual data of a certain television program are distributed among data slices (the three data slices DS#0 through DS#2 in FIG. 9), and are then transmitted from the transmission device 11.

Therefore, the reception device 12 receives the three data slices DS#0 through DS#2 for the actual data of the television program corresponding to the PLPs#0, and needs to perform recomposition from the PLPs#0 contained in the three data slices DS#0 through DS#2.

A unit transmission band is 6 MHz in FIG. 3, but a unit transmission band is 5.72 MHz in FIG. 6. In FIG. 3, 6 MHz is equivalent to 4096 subcarriers contained in an OFDM signal according to DVB-C2. In FIG. 6, 5.72 MHz is equivalent 3409 subcarriers, which are the effective subcarriers among the 4096 subcarriers.

Also, in FIG. 6, only (part of) one PLP#0 is transmitted with one data slice DS#n−1. However, with one data slice DS#n−1, it is possible to transmit not only one PLP#0 but also a PLP other than the PLPs#0 (regardless of whether these PLPs are to be subjected to PLP bundling).

Second Example Structure of the Reception Device 12

Figure 10:
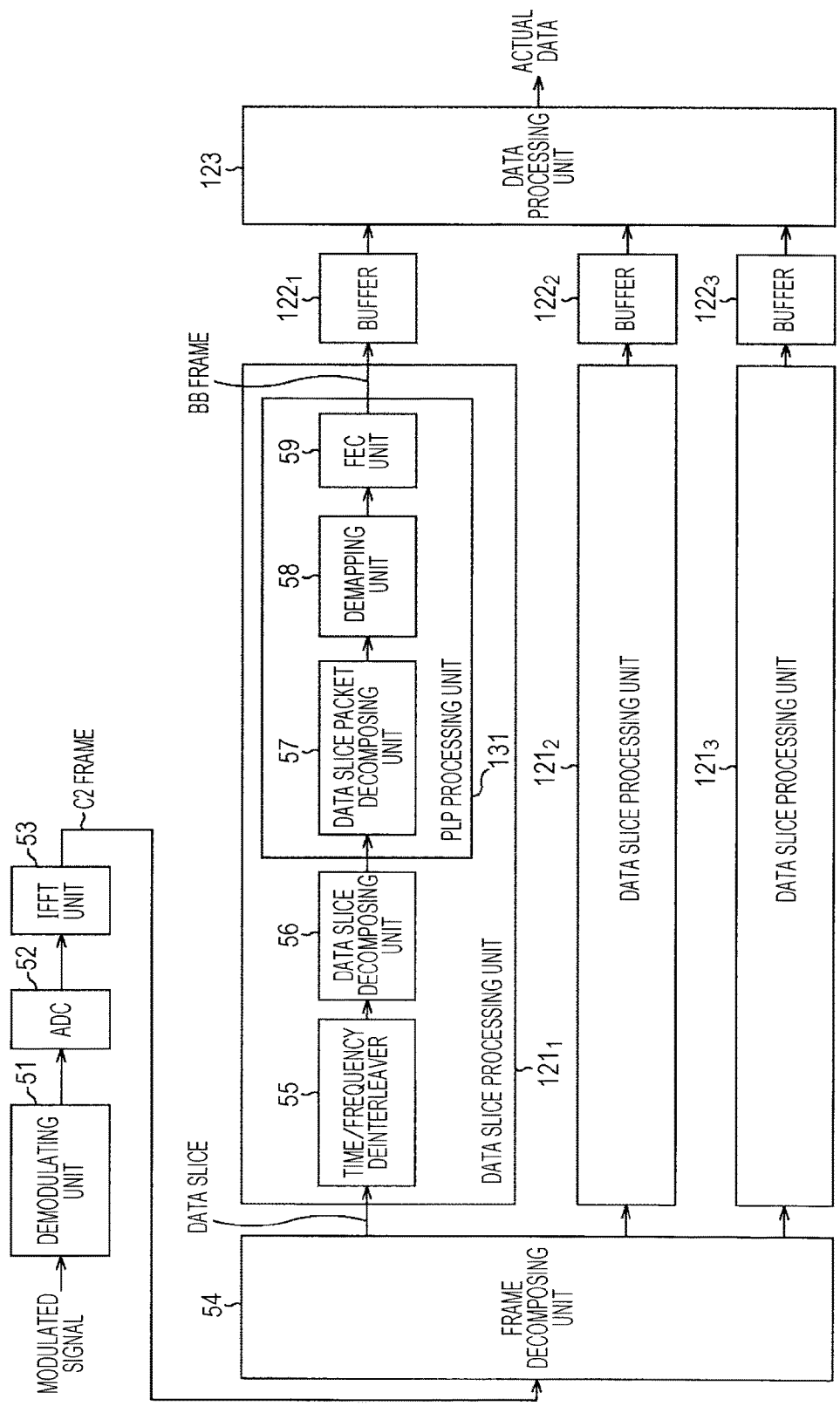
FIG. 10 is a block diagram showing a second example structure of the reception device 12.

FIG. 10 is a block diagram showing a second example structure of the reception device 12 shown in FIG. 1.

In the drawing, the components equivalent to those in FIG. 4 are denoted by the same reference numerals as those used in FIG. 4, and explanation thereof is not repeated herein.

In the reception device 12 having the second example structure (FIG. 10), PLPs are distributed among three (or less) data slices and are transmitted (sent) by PLP bundling, so that actual data can be recomposed, as described above with reference to FIGS. 5 and 9.

In FIG. 10, the reception device 12 includes a demodulating unit 51, an ADC 52, an FFT unit 53, a frame decomposing unit 54, a time/frequency deinterleaver 55, a data slice decomposing unit 56, a data slice packet decomposing unit 57, a demapping unit 58, and an FEC unit 59. In this aspect, the reception device 12 is the same as the first example structure shown in FIG. 4.

However, the reception device 12 in FIG. 10 differs from the first example structure shown in FIG. 4, in further including three data slice processing units $121_1$, $121_2$, and $121_3$, for example, and three buffers $122_1$, $122_2$, and $122_3$ corresponding in number to the data slice processing units $121_1$ through $121_3$.

Furthermore, the reception device 12 in FIG. 10 differs from the second example structure shown in FIG. 4, in including a data processing unit 123, instead of the data processing unit 60.

The data slice processing unit $121_1$ is formed with the time/frequency deinterleaver 55, the data slice decomposing unit 56, and a PLP processing unit 131, and the PLP processing unit 131 is formed with the data slice packet decomposing unit 57, the demapping unit 58, and the FEC unit 59.

The data slice processing units $121_2$ and $121_3$ each have the same structure as the data slice processing unit $121_1$.

In FIG. 10, the frame decomposing unit 54 decomposes a C2 frame supplied from the FFT unit 53, to extract the three data slices DS#0, 1, and 2 contained in the C2 frame, for example, the data slices DS#0, 1, and 2 containing PLPs with the same PLP_ID transmitted by PLP bundling.

The frame decomposing unit 54 then supplies a data slice DS#n−1 to the data slice processing unit $121_n$.

In the data slice processing unit $121_n$, the components from the time/frequency deinterleaver 55 through the FEC unit 59 perform the same processes as those in the case shown in FIG. 4 on the data slice DS#n−1 supplied from the frame decomposing unit 54, to restore a divisional stream formed with BB frames.

The divisional stream restored from the data slice DS#n−1 is supplied from the data slice processing unit $121_n$ to the buffer $122_n$.

The buffer $122_n$ is formed with an FIFO (First In First Out) memory, for example, and sequentially stores (the BB frames constituting) the divisional stream supplied from the data slice processing unit $121_n$.

The data processing unit 123 rearranges the BB frames to recompose the original BB stream by reading the BB frames from the buffer $122_n$ in sequential order of the BB frames constituting the original BB stream based on the ISSYs (ISCRs) contained in the BB headers of the BB frames constituting the three divisional streams stored in the buffers $122_1$ through $122_3$.

The data processing unit 123 further decomposes the BB frames constituting the original BB stream, and restores and outputs actual data.

As described above, in the reception device 12, the data processing unit 123 rearranges BB frames based on the ISSYs contained in the BB headers of the BB frames constituting three divisional streams. Therefore, the BB frames constituting a divisional stream are stored in the buffer $122_n$.

The BB frames constituting the divisional stream stored in the buffer $122_n$ remain stored in the buffer $122_n$ until the time according to the sequence in the original BB stream, and is read from the buffer $122_n$ when the time according to the sequence in the original BB stream comes.

Figure 11:
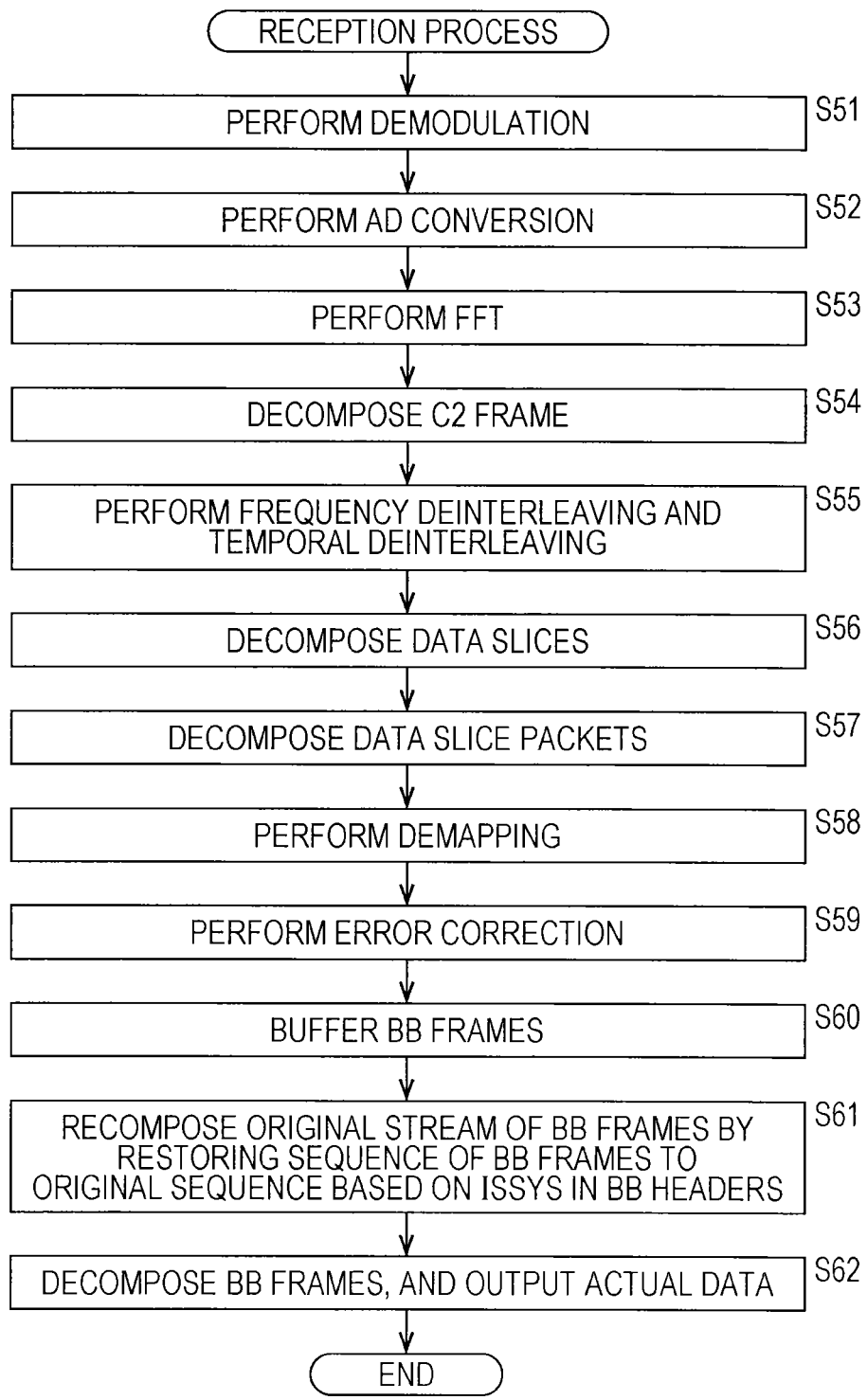
FIG. 11 is a flowchart for explaining an example of the process (reception process) to be performed by the reception device 12 in a case where data transmitted by PLP bundling is received.

FIG. 11 is a flowchart for explaining an example of the process (reception process) to be performed by the reception device 12 shown in FIG. 10 in a case where data transmitted by PLP bundling is received.

In step S51, the demodulating unit 51 receives and demodulates an RF signal, and supplies the resultant demodulated signal to the ADC 52. The process then moves on to step S52.

In step S52, the ADC 52 performs AD conversion on the demodulated signal supplied from the demodulating unit 51, and supplies the resultant digital signal to the FFT unit 53. The process moves on to step S53.

In step S53, the FFT unit 53 performs FFT on the digital signal supplied from the ADC 52, and supplies the resultant C2 frame to the frame decomposing unit 54. The process then moves on to step S54.

In step S54, the frame decomposing unit 54 decomposes the C2 frame supplied from the FFT unit 53, to extract the three data slices DS#0, 1, and 2 contained in the C2 frame, the data slices DS#0, 1, and 2 containing PLPs with the same PLP_ID transmitted by PLP bundling. The frame decomposing unit 54 supplies a data slice DS#n−1 to the data slice processing unit $121_n$. The process then moves on to step S55.

In step S55, the time/frequency deinterleaver 55 of the data slice processing unit $121_n$ deinterleaves the data slice DS#n−1 supplied from the frame decomposing unit 54 in the frequency direction, further deinterleaves the data slice DS#n−1 in the temporal direction, and supplies the deinterleaved data slice DS#n−1 to the data slice decomposing unit 56. The process then moves on to step S56.

In step S56, the data slice decomposing unit 56 decomposes the data slice #n−1 supplied from the time/frequency deinterleaver 55 into data slice packets, and supplies the data slice packets to the data slice packet decomposing unit 57. The process then moves on to step S57.

In step S57, the data slice packet decomposing unit 57 decomposes the data slice packets supplied from the data slice decomposing unit 56 into FEC frames, and supplies the FEC frames to the demapping unit 58. The process then moves on to step S58.

In step S58, the demapping unit 58 performs demapping on (the symbols of) the FEC frames supplied from the data slice packet decomposing unit 57, and supplies the FEC frames to the FEC unit 59. The process then moves on to step S59.

In step S59, the FEC unit 59 performs error correction on the damapped FEC frames supplied from the demapping unit 58, and supplies the resultant divisional stream formed with BB frames to the buffer $122_n$. The process then moves on to step S60.

In step S60, the buffer $122_n$ stores (buffers) the BB frames of the divisional stream supplied from (the FEC unit 59 of) the data slice processing unit $121_n$. The process then moves on to step S61.

In step S61, the data processing unit 123 rearranges the BB frames to recompose the original BB stream by reading the BB frames from the buffers $122_1$ through $122_3$ as appropriate based on the ISSYs (ISCRs) contained in the BB headers of the BB frames constituting the three divisional streams stored in the buffers $122_1$ through $122_3$. The process then moves on to step S62.

In step S62, the data processing unit 123 decomposes the BB frames constituting the original BB stream, and restores and outputs actual data.

As described above, by PLP bundling, the BB frames of a BB stream generated from (formed with) actual data as one PLP are distributed among data slices in the transmission device 11, so that the BB stream is divided into divisional streams on a BB frame basis, and the divisional streams (PLPs with the same PLP_ID) are sent (transmitted) with the respective data slices.

In the reception device 12, in turn, the BB frames in the divisional streams are rearranged based on the ISSYs contained in the BB headers, and the original BB stream is recomposed from the divisional streams obtained from the data transmitted from the transmission device 11.

Accordingly, by PLP bundling, actual data with a high data rate that is difficult to be transmitted with one data slice can be transmitted with data slices.

[BB Stream Dividing]

Figure 12:
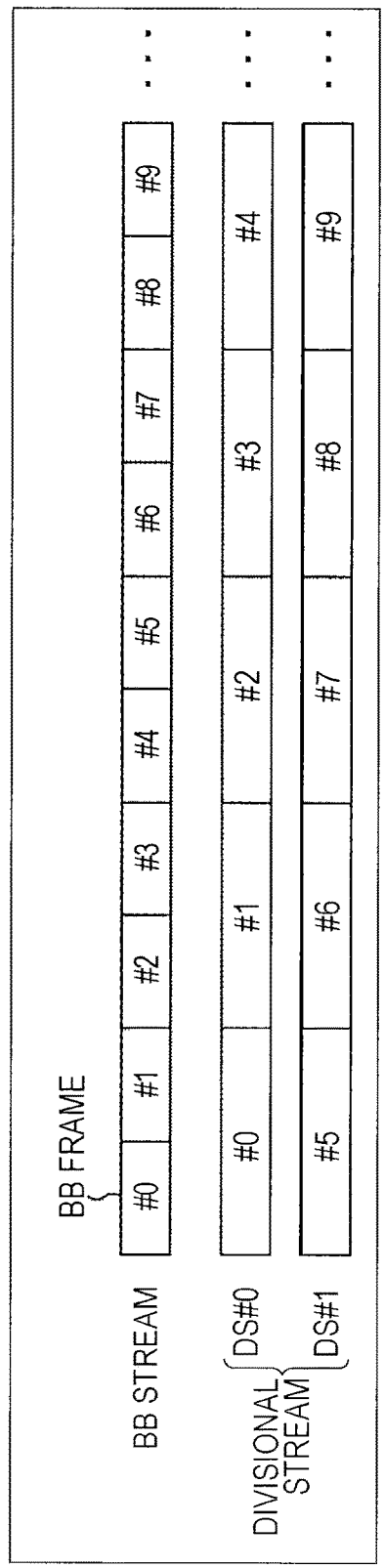
FIG. 12 is a diagram showing an example of a method of dividing a BB stream into divisional streams by distributing BB frames among data slices in PLP bundling.

FIG. 12 is a diagram showing an example of a method of dividing a BB stream into divisional streams by distributing BB frames among data slices in PLP bundling.

In FIG. 12, the BB frame constituting a (original) BB stream are distributed between two data slices DS#0 and DS#1, so that the BB stream is divided into two divisional streams.

Hereinafter, a divisional stream formed with the BB frame distributed to a data slice DS#n−1 will be also written as a divisional stream DS#n−1.

Also, the jth BB frame counted from the top of a (original) BB stream will be hereinafter also written as a BB frame #j−1 (or #j).

Further, for ease of explanation, in the description below, a BB stream is distributed between the two data slices DS#0 and DS#1, so as to be divided into two divisional streams DS#0 and DS#1.

In FIG. 12, the four BB frames #0 through #4 from the top of the BB stream are distributed to the data slice DS#0, and the four BB frames #5 through #9 that follow are distributed to the data slice DS#1. Thereafter, BB frames are distributed in the same manner, so that the BB stream is divided into the two divisional streams DS#0 and DS#1.

In DVB-C2, the details of a method of dividing a BB stream into divisional streams in PLP bundling are not specified.

Therefore, as a method of dividing a BB stream, it is possible to employ a method of alternately distributing the same number, such as four, of BB frames to the data slices DS#0 and DS#1 as shown in FIG. 12, or a method of alternately distributing different numbers of BB frames to the data slices DS#0 and DS#1.

In the reception device 12 (FIG. 10), however, the BB frames constituting a divisional stream DS#n−1 is stored into the buffer $122_n$, and are read from the buffer $122_n$ at the time according to the sequence in the original BB stream, so as to recompose the original BB stream.

Therefore, in a case where there are no restrictions on the method of dividing a BB stream, it is difficult to determine the capacity of the buffer $122_n$ required for recomposing an original BB stream in the reception device 12.

In this case, so as to recompose an original BB stream, there might be a need to employ a buffer with an extremely large capacity as the buffer $122_n$ in the reception device 12, leading to an increase in the costs of the reception device 12.

In view of this, the data processing unit 101 of the transmission device 11 shown in FIG. 5 can limit the data rate ratio between the data rates of divisional streams obtained as a result of dividing of a BB stream.

That is, the data processing unit 101 limits the data rate ratio between the data rates of divisional streams to be obtained as a result of dividing of a BB stream to a value within a predetermined range (within a predetermined range of ratios) so as not to cause a large difference between the data rates of the divisional streams. The data processing unit 101 then divides the BB stream.

In a case where the data rate ratio between the data rates of divisional streams is not limited, a small number, such as one, of BB frames is distributed to the data slice DS#0, and a large number, such as 100, of BB frames are then distributed to the data slice DS#1, for example. This is repeated in dividing of a BB stream.

In this case, if one BB frame is transmitted with the data slice DS#0 and 100 BB frames are transmitted with the data slice DS#1 in a certain time T, the reception device 12 shown in FIG. 10 needs to have buffers with extremely different capacities from each other as the buffer $122_1$ to store the divisional stream DS#0 (the divisional stream formed with the BB frames distributed to the data slice DS#0) and the buffer $122_2$ to store the divisional stream DS#1.

That is, for ease of explanation, if the BB frames constituting divisional frames are stored in the reception device 12, and the BB frames are read out at the times according to the sequence in the original BB stream, a buffer with a small capacity to store one BB frame to be transmitted in the time T can be employed as the buffer $122_1$, but a buffer with a large capacity to store 100 BB frames to be transmitted in the time T needs to be prepared as the buffer $122_2$.

In the data processing unit 101 (FIG. 5), the data rate ratio between the data rates of the divisional streams obtained as a result of dividing of a BB stream is limited to a value within a predetermined range so as not to cause a large difference between the data rates of the divisional streams. With this arrangement, there is no need for the buffer $122_2$ to have the above described large capacity.

That is, in a case where the data rate ratio between the data rate of the divisional stream DS#0 to be transmitted with the data slice DS#0 and the data rate of the divisional stream DS#1 to be transmitted with the data slice DS#1 is limited to a value, such as 1:2, within such a range as not to cause a large difference between the data rates of the divisional streams DS#0 and DS#1, the data processing unit 101 divides a BB stream by repeating the process of distributing one BB frame to the data slice DS#0 and then distributing two BB frames to the data slice DS#1, for example.

In this case, the reception device 12 in FIG. 10 does not need to have buffers with extremely different capacities from each other as the buffer $122_1$ to store the divisional stream DS#0 and the buffer $122_2$ to store the divisional stream DS#1.

As a result, the buffer $122_2$ does not need to have a large capacity as described above, the costs of the reception device 12 are lowered, and PLP bundling as a kind of CB can be performed.

It should be noted that the above described limiting of the data rate ratio between the data rates of the divisional streams obtained as a result of dividing of a BB stream is performed in step S12 in FIG. 6 in the data processing unit 101 (FIG. 5).

In the data processing unit 101 (FIG. 5), even if the data rate ratio between the data rates of the divisional streams DS#0 and DS#1 obtained as a result of dividing of a BB stream is limited to a value within a predetermined range so as not to cause a large difference between the data rates of the divisional streams DS#0 and DS#1, the buffers $122_1$ and $122_2$ might need to have large capacities in some cases.

That is, even if the data rate ratio between the divisional streams DS#0 and DS#1 is limited to 1:2 as described above, for example, the buffers $122_1$ and $122_2$ might need to have large capacities in a case where the data processing unit 101 divides a BB stream by repeating the process of distributing a large number, such as 100, of BB frames to the data slice DS#0 and then distributing a large number, such as 200, of BB frames to the data slice DS#1.

In view of this, the data processing unit 101 (FIG. 5) can limit the number of BB frames to be uninterruptedly distributed to one data slice in dividing of a BB stream.

In dividing of a BB stream, the number of BB frames to be uninterruptedly distributed to one data slice is limited to a smaller frame number than 10, for example, so that the BB stream is not divided by uninterruptedly distributing large numbers, such as 100 and 200, of BB frames to the data slices DS#0 and DS#1 as described above.

As a result, the buffers $122_1$ and $122_2$ do not need to have large capacities, the costs of the reception device 12 are lowered, and PLP bundling as a kind of CB can be performed.

It should be noted that, like the limiting of the data rate ratio between the data rates of divisional streams, the above described limiting of the number of BB frames to be uninterruptedly distributed to one data slice is performed in step S12 in FIG. 6 in the data processing unit 101 (FIG. 5).

In a case where a BB stream is divided into two divisional streams DS#0 and DS#1, if the number of BB frames to be uninterruptedly distributed to one data slice is limited to 10, the buffer capacities of the buffers $122_1$ and $122_2$ of the reception device 12 (FIG. 10) can be determined according to the equation (1), for example.

$$\text{Buffer capacity [bits]}=58192\times10\text{[bits]}+\text{margin to accommodate decoded output delay difference [bits]} \quad (1)$$

In the equation (1), 58192 is the maximum value of the size Kbch of the data to be subjected to the BCH encoding described above with reference to FIG. 7, or the maximum value (number of bits) of the size of a BB frame.

Also, in the equation (1), the decoded output delay difference means (the maximum value of) a difference between the times at which divisional streams are obtained from two data slice processing units $121_n$ and $121_n$ in a case where the same data slice is supplied to the two data slice processing units $121_n$ and $121_n$ such as the data slice processing unit $121_1$ in the stage before the buffer $122_1$ and the data slice processing unit $121_2$ in the stage before the buffer $122_2$ in the reception device 12 shown in FIG. 10.

Meanwhile, the transmission rate at which data can be transmitted with a data slice varies with the data slice width and the notch width, for example.

Therefore, in a case where a BB stream is divided into two divisional streams DS#0 and DS#1, the data slice DS#0 for transmitting (the BB frames constituting) the divisional stream DS#0 and the data slice DS#1 for transmitting the divisional stream DS#1 might have different transmission rates from each other.

Figure 13:
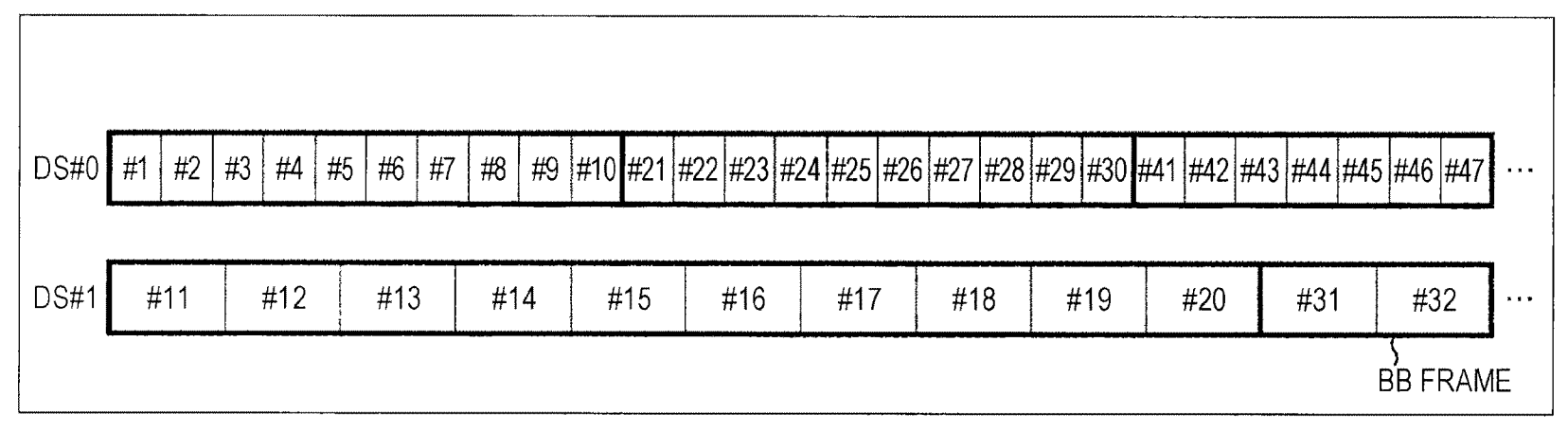

FIG. 13 is a diagram showing an example of the divisional streams DS#0 and #1 to be transmitted with the data slices DS#0 and DS#1, respectively, in a case where the transmission rate ratio between the transmission rates of the data slices DS#0 and DS#1 is 2.2:1.

In FIG. 13, the data rate ratio between the data rates of the divisional streams DS#0 and DS#1 is limited to a value within a predetermined range, so as not to cause a large difference between the data rates of the divisional streams DS#0 and DS#1.

Further, in FIG. 13, the number of BB frames to be uninterruptedly distributed to one data slice is limited to 10, for example.

In FIG. 13, the 10 BB frames #1 through #10 from the top of the BB stream are distributed to the data slice DS#0, and the 10 BB frames #11 through #20 that follow are distributed to the data slice DS#1. Thereafter, BB frames are distributed in the same manner, so that the BB stream is divided into the two divisional streams DS#0 and DS#1.

In FIG. 13, the transmission rate ratio between the data slices DS#0 and DS#1 is 2.2:1, and therefore, the time required for transmission of BB frames with the data slice DS#1 is 2.2 times as long as the time required for transmission of BB frames with the data slice DS#0.

To put it simply, when the BB frame #21 transmitted with the data slice DS#0 is stored into the buffer $122_1$ in the reception device 12 shown in FIG. 10, only the BB frames #11 through #15 transmitted with the data slice DS#1 are already stored in the buffer $122_2$.

When the data processing unit 123 in the reception device 12 (FIG. 10) recomposes a BB stream, the BB frame #21 stored in the buffer $122_1$ needs to be read out after the BB frame #20 located immediately before the BB frame #21 is read out.

In FIG. 13, however, the BB frame #20 is transmitted with the data slice DS#1. The BB frame #20 transmitted with the data slice DS#1 is stored into the buffer $122_2$ at the same time as the BB frames #42 and #43 transmitted with the data slice DS#0 are stored into the buffer $122_1$. Until then, the BB frame #21 stored in the buffer $122_1$ cannot be read out, and needs to remain stored in the buffer $122_1$.

Furthermore, at least the BB frames transmitted with the data slice DS#0 after the BB frame #21 (at least the BB frames #22 through #30 and #41 through #43 in FIG. 13) need to remain stored in the buffer $122_1$ until the BB frame #20 is read from the buffer $122_2$. As a result, a buffer with a large buffer capacity needs to be prepared as the buffer $122_1$.

Here, the BB frames (such as the BB frame #20 stored in the buffer $122_2$, hereinafter also called the preceding frames) located immediately before the BB frames stored in one of the buffers $122_1$ and $122_2$ (such as the BB frame #21 stored in the buffer $122_1$) are not stored in the other one of the buffers, as described above. Therefore, the BB frames stored in one of the buffers (such as the BB frame #21) cannot be read out, and reading out the BB frames stored in one of the buffers (such as the BB frame #21) needs to wait until the preceding frames (such as the BB frame #20) are stored into the other buffer and are read from the other buffer. This is also called the waiting for BB frame readout.

At the data processing unit 101 (FIG. 5), distribution of BB frames to data slices can be controlled in accordance with the transmission rate ratio between the data slices in dividing a BB stream, so that the waiting for BB frame readout is minimized.

That is, in dividing a BB stream at the data processing unit 101, distribution of BB frames to data slices can be controlled in accordance with the transmission rate ratio between the data slices, so that the data rate ratio between divisional streams becomes as close to the transmission rate ratio between the data slices as possible.

Figure 14:
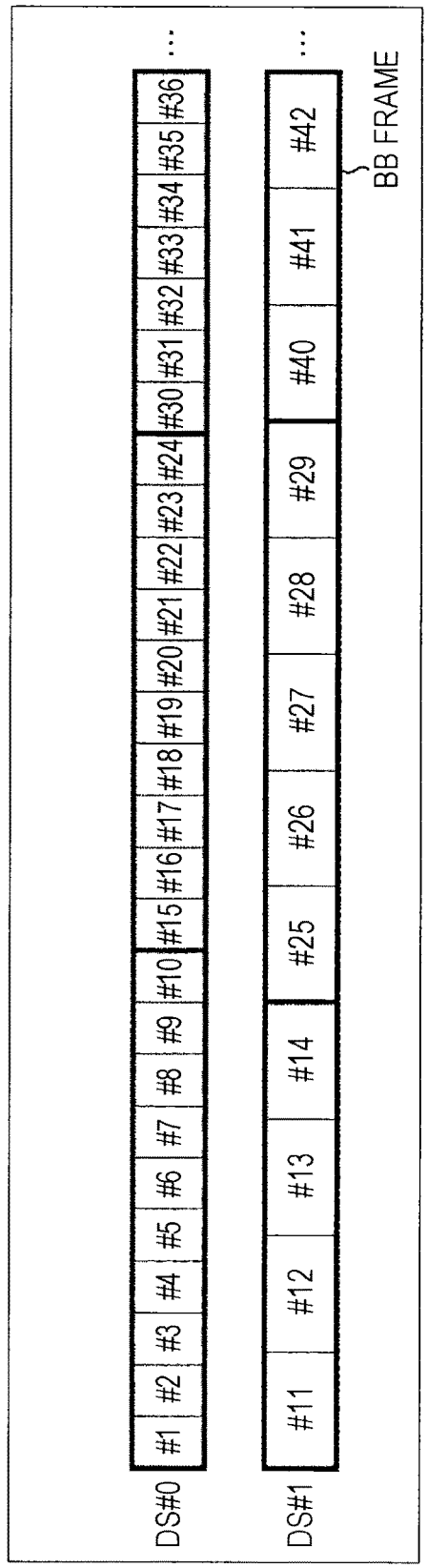
FIG. 14 is a diagram for explaining an example of control on distribution of BB frames to the data slices DS#0 and DS#1 in accordance with the transmission rate ratio between the data slices DS#0 and DS#1 in a case where a BB stream is divided into the divisional streams DS#0 and #1.

FIG. 14 is a diagram for explaining an example of control on distribution of BB frames to the data slices DS#0 and DS#1 in accordance with the transmission rate ratio between the data slices DS#0 and DS#1 in a case where a BB stream is divided into the divisional streams DS#0 and #1.

The data processing unit 101 distributes BB frames to the data slices DS#0 and DS#1 in accordance with the transmission rate ratio between the data slices DS#0 and DS#1, so that the waiting for BB frame readout is minimized in the reception device 12 shown in FIG. 10.

Like FIG. 13, FIG. 14 shows an example of the divisional streams DS#0 and #1 to be transmitted with the data slices DS#0 and DS#1, respectively, in a case where the transmission rate ratio between the data slices DS#0 and DS#1 is 2.2:1.

In FIG. 14, the data rate ratio between the data rates of the divisional streams DS#0 and DS#1 is limited to a value within a predetermined range as in the case illustrated in FIG. 13, and the number of BB frames to be uninterruptedly distributed to one data slice is limited to 10.

Further, in FIG. 14, distribution of BB frames to the data slices DS#0 and DS#1 is controlled in accordance with the transmission rate ratio of 2.2:1 between the data slices DS#0 and DS#1, so that the waiting for BB frame readout is minimized.

That is, in FIG. 14, the 10 BB frames #1 through #10 from the top of the BB stream are distributed to the data slice DS#0, and the four BB frames #11 through #14 that follow are distributed to the data slice DS#1. Further, in FIG. 14, the 10 BB frames #15 through #24 that follow are distributed to the data slice DS#0, and the five BB frames #25 through #29 that follow are distributed to the data slice DS#1.

The 10 BB frames #30 through #39 that follow are distributed to the data slice DS#0, and the four BB frames #40 through #43 that follow are distributed to the data slice DS#1. Thereafter, BB frames are distributed in the same manner, so that the BB stream is divided into the two divisional streams DS#0 and DS#1.

In FIG. 14, the transmission rate ratio between the data slices DS#0 and DS#1 is 2.2:1, and therefore, the time required for transmission of BB frames with the data slice DS#1 is 2.2 times as long as the time required for transmission of BB frames with the data slice DS#0, as in FIG. 13.

However, in FIG. 14, distribution of BB frames to the data slices DS#0 and DS#1 is controlled in accordance with the transmission rate ratio of 2.2:1 between the data slices DS#0 and DS#1, so that the waiting for BB frame readout is minimized.

That is, in FIG. 14, distribution of BB frames to the data slices DS#0 and DS#1 is controlled so that the data rate ratio between the divisional streams DS#0 and DS#1 becomes as close to the transmission rate ratio of 2.2:1 between the data slices DS#0 and DS#1 as possible, for example.

Therefore, when the BB frame #15 transmitted with the data slice DS#0 is stored into the buffer $122_1$ in the reception device 12 shown in FIG. 10, the BB frame #14 that is located immediately before the BB frame #15 and is transmitted with the data slice DS#1 is already stored in the buffer $122_2$.

Accordingly, the BB frame #15 stored in the buffer $122_1$ can be read out immediately after the BB frame #14 stored in the buffer $122_2$ is read out.

Also, in FIG. 14, when the BB frame #30 transmitted with the data slice DS#0 is stored into the buffer $122_1$, the BB frame #29 that is located immediately before the BB frame #30 and is transmitted with the data slice DS#1 is already stored in the buffer $122_2$.

Accordingly, the BB frame #30 stored in the buffer $122_1$ can be read out immediately after the BB frame #29 stored in the buffer $122_2$ is read out.

As described above, distribution of BB frames to the data slices DS#0 and DS#1 is controlled in accordance with the transmission rate ratio of 2.2:1 between the data slices DS#0 and DS#1, so that the waiting for BB frame readout is minimized. In this manner, the waiting for BB frame readout is (almost) eliminated.

As a result, the need for a buffer with a large buffer capacity as the buffer $122_1$ (or $122_2$) due to the waiting for BB frame readout can be eliminated. That is, the costs of the reception device 12 can be lowered, and PLP bundling as a kind of CB can be performed.

It should be noted that, like the limiting of the data rate ratio between divisional streams and the limiting of the number of BB frames to be uninterruptedly distributed to one data slice, the above described control on distribution of BB frames to the data slices DS#0 and DS#1 in accordance with the transmission rate ratio between the data slices is performed in step S12 in FIG. 6 in the data processing unit 101 (FIG. 5).

<Description of a Computer to which the Present Technology is Applied>

The above described series of processes can be performed with hardware, and can also be performed with software. Where the series of processes are performed with software, the program that forms the software is installed into a general-purpose computer or the like.

Figure 15:
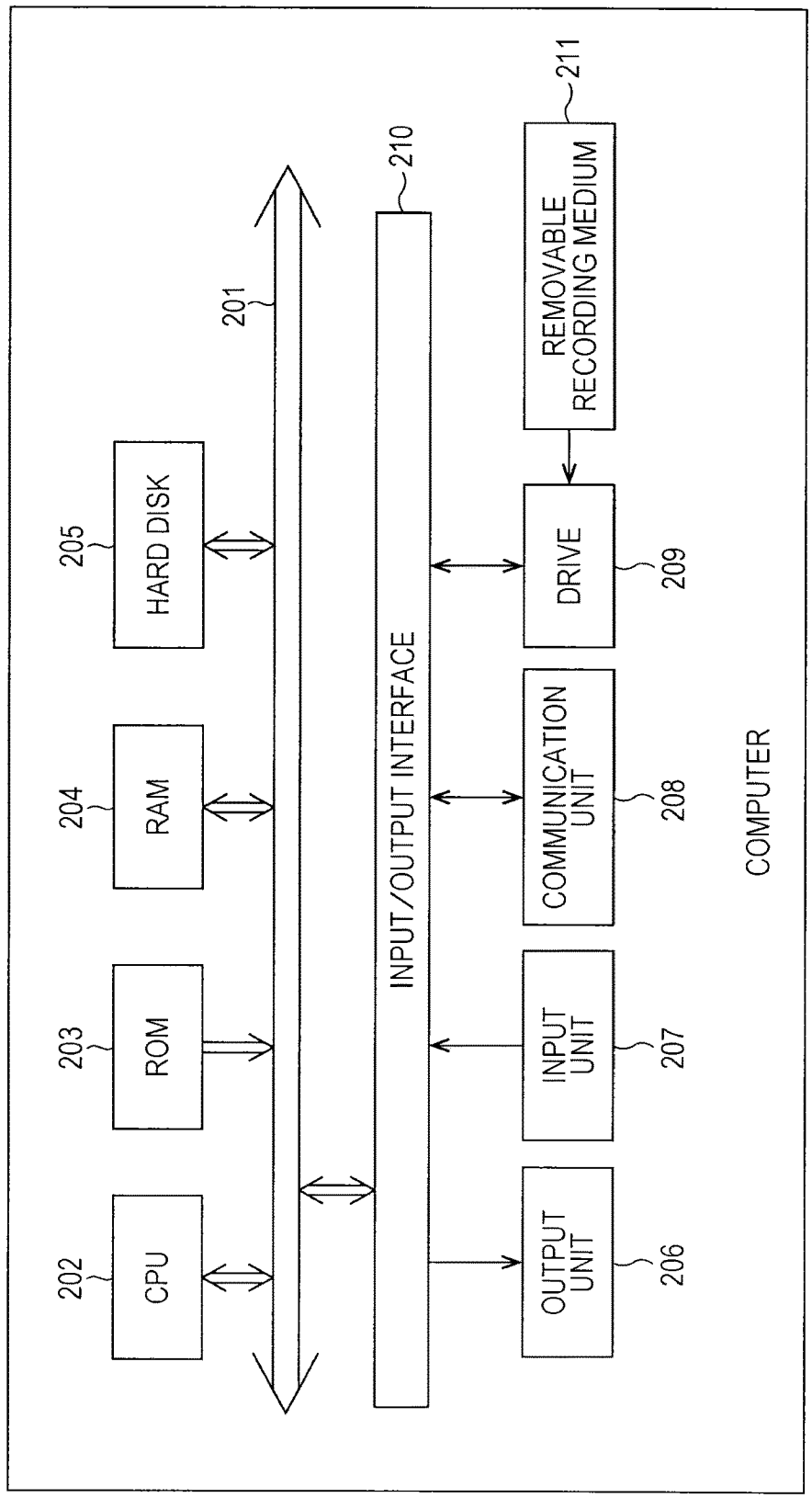
FIG. 15 is a block diagram showing an example structure of an embodiment of a computer to which the present technology is applied.

In view of this, FIG. 15 shows an example structure of an embodiment of a computer into which the program for performing the above described series of processes is installed.

The program can be recorded beforehand in a hard disk 205 or a ROM 203 provided as a recording medium in the computer.

Alternatively, the program can be stored (recorded) in a removable recording medium 211. Such a removable recording medium 211 can be provided as so-called packaged software. Here, the removable recording medium 211 may be a flexible disk, a CD-ROM (Compact Disc Read Only Memory), an MO (Magneto Optical) disk, a DVD (Digital Versatile Disc), a magnetic disk, or a semiconductor memory, for example.

The program can be installed into the computer from the above described removable recording medium 211, but can also be downloaded into the computer via a communication network or a broadcasting network and be installed into the internal hard disk 205. That is, the program can be wirelessly transferred from a download site, for example, to the computer via an artificial satellite for digital satellite broadcasting, or can be transferred by cable to the computer via a network such as a LAN (Local Area Network) or the Internet.

The computer includes a CPU (Central Processing Unit) 202, and an input/output interface 210 is connected to the CPU 202 via a bus 201.

When an instruction is input by a user operating an input unit 207 or the like via the input/output interface 210, the CPU 202 executes the program stored in the ROM (Read Only Memory) 203 in accordance with the instruction. Alternatively, the CPU 202 loads the program stored in the hard disk 205 into a RAM (Random Access Memory) 204, and executes the program.

By doing so, the CPU 202 performs the processes according to the above described flowcharts, or performs the processes with the structures illustrated in the above described block diagrams. Where necessary, the CPU 202 outputs the process results from an output unit 206 or transmit the process results from a communication unit 208, via the input/output interface 210, for example, and further stores the process results into the hard disk 205.

The input unit 207 is formed with a keyboard, a mouse, a microphone, and the like. The output unit 206 is formed with an LCD (Liquid Crystal Display), a speaker, and the like.

In this specification, the processes performed by the computer in accordance with the program are not necessarily performed in chronological order compliant with the sequences shown in the flowcharts. That is, the processes to be performed by the computer in accordance with the program include processes to be performed in parallel or independently of one another (such as parallel processes or object-based processes).

The program may be executed by one computer (processor), or may be executed in a distributive manner by more than one computer. Further, the program may be transferred to a remote computer, and be executed therein.

In this specification, a system means an assembly of components (devices, modules (parts), and the like), and not all the components need to be provided in the same housing. In view of this, devices that are housed in different housings and are connected to each other via a network form a system, and one device having modules housed in one housing is also a system.

It should be noted that embodiments of the present technology are not limited to the above described embodiments, and various modifications may be made to them without departing from the scope of the present technology.

For example, the present technology can be embodied in a cloud computing structure in which one function is shared among devices via a network, and processing is performed by the devices cooperating with one another.

The respective steps described with reference to the above described flowcharts can be carried out by one device or can be shared among devices.

In a case where more than one process is included in one step, the processes included in the step can be performed by one device or can be shared among devices.

The advantageous effects described in this specification are merely examples, and the advantageous effects of the present technology are not limited to them and may include other effects.

The present technology may also be embodied in the structures described below.

<1>

A data processing device including a dividing unit that divides a BB stream as a stream of BB (Baseband) frames into divisional streams by distributing the BB frames of the BB stream to data slices, wherein the dividing unit divides the BB stream by limiting the data rate ratio between the data rates of the divisional streams.

<2>

The data processing device of <1>, wherein the dividing unit divides the BB stream by limiting the number of BB frames to be uninterruptedly distributed to one of the data slices.

<3>

The data processing device of <1> or <2>, wherein the dividing unit controls the distribution of the BB frames to the data slices in accordance with the transmission rate ratio between the transmission rates at which data can be transmitted with the data slices.

<4>

A data processing method including the step of dividing a BB stream as a stream of BB (Baseband) frames into divisional streams by distributing the BB frames of the BB stream to data slices, wherein the dividing of the BB stream is performed by limiting the data rate ratio between the data rates of the divisional streams.

<5>

A data processing device including a recomposing unit that recomposes an original BB stream as a stream of BB (Baseband) frames from divisional streams transmitted from a transmission device, the transmission device including a dividing unit that divides the BB stream into the divisional streams by distributing the BB frames of the BB stream to data slices, the dividing unit dividing the BB stream by limiting the data rate ratio between the data rates of the divisional streams.

<6>

The data processing device of <5>, wherein the dividing of the BB frame is performed by limiting the number of BB frames to be uninterruptedly distributed to one of the data slices.

<7>

The data processing device of <5> or <6>, wherein the distribution of the BB frames to the data slices is performed in accordance with the transmission rate ratio between the transmission rates at which data can be transmitted with the data slices.

<8>

A data processing method including the step of recomposing an original BB stream as a stream of BB (Baseband) frames from divisional streams transmitted from a transmission device, the transmission device including a dividing unit that divides the BB stream into the divisional streams by distributing the BB frames of the BB stream to data slices, the dividing unit dividing the BB stream by limiting the data rate ratio between the data rates of the divisional streams.

REFERENCE SIGNS LIST

11 Transmission device
12 Reception device
13 Transmission channel
$21_1$ through $21_N$ Data slice processing unit
22 Frame composing unit
23 IFFT unit
24 DAC
25 Modulating unit
$31_1$ through $31_M$ PLP processing unit
32 Data slice composing unit
33 Time/frequency interleaver
41 Data processing unit
42 FEC unit
43 Mapping unit
44 Data slice packet composing unit
51 Demodulating unit
52 ADC
53 FFT unit
54 Frame decomposing unit
55 Time/frequency deinterleaver
56 Data slice decomposing unit
57 Data slice packet decomposing unit
58 Demapping unit
59 FEC unit
60 Data processing unit
101 Data processing unit
111 PLP processing unit
$121_1$ through $121_3$ Data slice processing unit
$122_1$ through $122_3$ Buffer
123 Data processing unit
131 PLP processing unit
201 Bus
202 CPU
203 ROM
204 RAM
205 Hard Disk
206 Output unit
207 Input unit
208 Communication unit
209 Drive
210 Input/output interface
211 Removable recording medium

The invention claimed is:

1. A data processing device comprising:
a processing circuit configured to:
receive a baseband (BB) stream; and
divide the BB stream as a stream of BB frames into a plurality of divisional streams by distributing groups of uninterrupted BB frames of the BB stream to a plurality of data slices for output,
wherein
the groups of uninterrupted BB frames are distributed to the data slices in a manner that a data rate ratio between data rates of two of the divisional streams is set based on a transmission rate ratio between corresponding two of the data slices,
the BB frames are distributed to the data slices in a manner that the data rate ratio between the data rates of the two of the divisional streams is limited to 2.2, and
a number of BB frames in any of the groups of uninterrupted BB frames is equal to or less than 10.

2. The data processing device according to claim 1, wherein the processing circuit is further configured to include in each BB frame of the BB stream transmission time information of the respective BB frame.

3. A data processing method comprising:
receiving a baseband (BB) stream;
dividing, by a processing circuit of a data processing device, the BB stream as a stream of BB frames into a plurality of divisional streams by distributing groups of uninterrupted BB frames of the BB stream to a plurality of data slices for output,
wherein
the groups of uninterrupted BB frames are distributed to the data slices in a manner that a data rate ratio between data rates of two of the divisional streams is set based on a transmission rate ratio between corresponding two of the data slices,
the BB frames are distributed to the data slices in a manner that the data rate ratio between the data rates of the two of the divisional streams is limited to 2.2, and
wherein a number of BB frames in any of the groups of uninterrupted BB frames is equal to or less than 10.

4. A data processing device comprising:
a processing circuit configured to:
receive a plurality of data slices that carries respective divisional streams; and
recompose an original baseband (BB) stream as a stream of BB frames from the divisional streams, the stream of BB frames is divided to the divisional streams by distributing groups of uninterrupted BB frames of the BB stream to the plurality of data slices,
wherein
the groups of uninterrupted BB frames are distributed to the data slices in a manner that a data rate ratio between data rates of two of the divisional streams is set based on a transmission rate ratio between corresponding two of the data slices,
the BB frames are distributed to the data slices in a manner that the data rate ratio between the data rates of the two of the divisional streams is limited to 2.2, and
a number of BB frames in any of the groups of uninterrupted BB frames is equal to or less than 10.

5. The data processing device according to claim 4, wherein the processing circuit is further configured to recompose the original BB stream based on respective transmission time information included in each BB frame of the BB stream.

6. A data processing method comprising:
receiving a plurality of data slices that carries respective divisional streams; and
recomposing, by a processing circuit of a data processing device, an original baseband (BB) stream as a stream of BB frames from the divisional streams, the stream of BB frames is divided to the divisional streams by distributing groups of uninterrupted BB frames of the BB stream to the plurality of data slices,
wherein
the groups of uninterrupted BB frames are distributed to the data slices in a manner that a data rate ratio between data rates of two of the divisional streams is set based on a transmission rate ratio between corresponding two of the data slices,
the BB frames are distributed to the data slices in a manner that the data rate ratio between the data rates of the two of the divisional streams is limited to 2.2, and
a number of BB frames in any of the groups of uninterrupted BB frames is equal to or less than 10.

* * * * *